US005838437A

United States Patent [19]
Miller et al.

[11] Patent Number: 5,838,437
[45] Date of Patent: Nov. 17, 1998

[54] REFERENCE SYSTEM FOR OPTICAL DEVICES INCLUDING OPTICAL SCANNERS AND SPECTRUM ANALYZERS

[75] Inventors: Calvin M. Miller, Naples, Fla.; Jeffrey W. Miller, Kennesaw, Ga.; Kevin Hsu; Yufei Bao, both of Roswell, Ga.; Tom Q.Y. Li, San Jose, Calif.

[73] Assignee: Micron Optics, Inc., Atlanta, Ga.

[21] Appl. No.: 833,602

[22] Filed: Apr. 9, 1997

Related U.S. Application Data

[60] Provisional application No. 60/031,562, Dec. 3, 1996 and provisional application No. 60/028,517, Oct. 18, 1996.

[51] Int. Cl.$^6$ ........................................ G01B 9/02
[52] U.S. Cl. ...................... 356/345; 356/352; 250/227.14
[58] Field of Search .................................. 356/35.5, 345, 356/352; 250/227.14, 227.19, 227.27; 385/12, 37

[56] References Cited

U.S. PATENT DOCUMENTS

| | | |
|---|---|---|
| 4,806,012 | 2/1989 | Meltz et al. . |
| 4,848,999 | 7/1989 | Taylor . |
| 4,892,388 | 1/1990 | Taylor . |
| 4,923,273 | 5/1990 | Taylor . |
| 4,996,419 | 2/1991 | Morey . |
| 5,062,684 | 11/1991 | Clayton et al. . |
| 5,073,004 | 12/1991 | Clayton et al. . |
| 5,212,745 | 5/1993 | Miller . |
| 5,212,746 | 5/1993 | Miller et al. . |
| 5,227,857 | 7/1993 | Kersey . |
| 5,289,552 | 2/1994 | Miller et al. . |
| 5,361,130 | 11/1994 | Kersey et al. . |
| 5,375,181 | 12/1994 | Miller et al. . |
| 5,380,995 | 1/1995 | Udd et al. . |
| 5,397,891 | 3/1995 | Udd et al. . |
| 5,401,956 | 3/1995 | Dunphy et al. . |
| 5,410,404 | 4/1995 | Kersey et al. . |

(List continued on next page.)

OTHER PUBLICATIONS

Boucher, R. et al. (1992), "Calibrated Fabry–Perot Etalon as an Absolute Frequency Reference for OFDM Communications," IEEE Photon. Tech. Lett. 4(7):801–803.

Davis, M.A. and Kersey, A.D. (1995) "Matched–filter interrogation technique for fibre Bragg grating arrays," Electron. Lett. 31(10):822–823.

Davis, M.A. and Kersey, A.D. (1994), "All–fibre Bragg grating strain–sensor demodulation technique using a wavelength division coupler," Electron. Lett. 30(1):75–77.

Dunphy, J. et al. (1993), "Instrumentation development in support of fiber grating sensor arrays," Proc. of the SPIE V. 2071, pp. 2–11.

(List continued on next page.)

Primary Examiner—Samuel A. Turner
Attorney, Agent, or Firm—Greenlee, Winner and Sullivan, P.C.

[57] ABSTRACT

A reference system for an optical wavelength scanner, used for measuring wavelengths of radiation from an optical device. The system utilizes a wavelength reference comprising a fixed fiber Fabry-Perot (FFP) filter in combination with a reference fiber Bragg grating (FBG) of accurately known wavelength to minimize the effects of drift and nonlinearities in the scanner. The system utilizes dual optical branches, one containing a device or devices which generate, emit or reflect light of a particular wavelength which is to be measured or identified and the other containing the reference. The two branches are periodically illuminated, while the wavelength band is scanned for peaks or notches in light intensity in the illuminated branch. The wavelengths, at which peaks or notches in the light intensity of each branch occur, are logged. The wavelengths of the reference comb of the fixed FFP are determined by reference to that of the reference FBG. Then, the peaks or notches in the light intensity from the device under test are located by interpolation with respect to the comb of peaks produced by the reference.

29 Claims, 18 Drawing Sheets

U.S. PATENT DOCUMENTS

| | | |
|---|---|---|
| 5,422,970 | 6/1995 | Miller et al. . |
| 5,426,297 | 6/1995 | Dunphy et al. . |
| 5,509,093 | 4/1996 | Miller et al. . |
| 5,513,913 | 5/1996 | Ball et al. . |
| 5,563,973 | 10/1996 | Miller et al. . |
| 5,591,965 | 1/1997 | Udd . |
| 5,682,237 | 10/1997 | Belk .................................... 356/352 |

OTHER PUBLICATIONS

Foote, P.D. (1994), "Fibre Bragg Grating Strain Sensors for Aerospece Smart Structures," Second European Conf. on Smart Structures and Materials, Glasgow, Session 8, pp. 290–293.

Friebele, E.J. and Kersey, A.D. (1994), "Fiberoptic sensors measure up for smart structures," Laser Focus World, pp. 165–169.

Gamache, C. et al. (1996), "An Optical Frequency Scale in Exact Multiples of 100 GHz for Standardization of Multifrequency Communications," IEEE Photon. Tech. Lett. 8(2):290–292.

Glance, B.S. et al. (1988), "Densely Spaced FDM Coherent Star Network With Optical Signals Confined to Equally Spaced Frequencies," J. Lightwave Technol. 6(11):1770–1781.

Jackson, D.A. et al. (1993), "Simple multiplexing scheme for a fiber–optic grating sensor network" Opt. Lett. 18(14):1192–1194.

Jackson, D.A. et al. (1993), Pseudoheterodyne Detection Scheme for Optical Interferometers Electron. Lett. 18(25):1081–1083.

Kersey, A.D. et al., "Development of Fiber Sensors for Structural Monitoring," SPIE 2456:262–268.

Kersey, A.D. et al. (1993), "Multiplexed fiber Bragg grating strain–sensor system with a fiber Fabry–Perot wavelength filter," Opt. Lett. 18(16):1370–1372.

Kersey, A.D, "Interrogation and Multiplexing Techniques for Fiber Bagg Grating Strain–Sensors," Optical Sciences Division Naval Research Laboratory (NRL) code 5674, distributed by NRL at SPIE Meeting Fall 1996, Denver, CO.

Kersey, A.D. et al. (1992), "High–Resolution Fibre–Grating Based Strain Sensor With Interferometric Wavelength–Shift Detection" Electron. Lett. 28(3):236–238.

Kersey, A.D. et al. (1993), "Fiber–optic Bragg grating strain sensor with drift–compensated high–resolution interferometric wavelength–shift detection" Opt. Lett. 18(1):72–74.

Martin, J. et al. (1997), "Use of a sampled Bragg grating as an in–fiber optical resonator for the realization of a referencng optical frequency scale for WDM communications," OFC '97 Technical Digest, pp. 284–285.

Melle, S.M. et al. (1993), "A Bragg Grating–Tuned Fiber Laser Strain Sensor System" IEEE Photon. Technol. Lett. 5(2):263–266.

Miller, C.M., "Characteristics and Applications of High Performance, Tunable, Fiber Fabry–Perot Filters," 41st ECTC Electronics Components & Technology Conf., Atlanta, GA, May 13–15, 1991, 4pp.

Rao, Y.–j. and Jackson, D.A. (1996), "Universal Fiber–Optic Point Sensor System for Quasi–Static Absolute Measurements of Multiparameters Exploiting Low Coherence Interrogation," J. Lightwave Technol. 14(4):592–600.

Rao, Y.–j. et al. (1996), "Strain sensing of modern composite materials with a spatial/wavelength–division multiplexed fiber grating network," Opt. Lett. 21(9):683–685.

Rao, Y–.j. et al. (1995), "Spatially–multiplexed fibre–optic Bragg grating strain and temperature sensor system based on interferometric wavelength–shift detection" Electron. Lett. 31(12):1009–1010.

Sakai, Y. et al. (1992), "Frequency Stabilization of Laser Diodes Using 1.51–1.55$\mu$m Absorption Lines of $^{12}C_2H_2$ and $^{13}C_2H^2$," IEEE J. Quantum Electron. 28(1):75–81.

Weis, R.S. et al. (1994), "A Four–Element Fiber Grating Sensor Array with Phase–Sensitive Detection," IEEE Photon. Technol. Lett. 6(12):1469–1472.

Xu, M.–G. et al. (1993), "Novel frequency–agile interrogation system for fibre Bragg grating sensor," Proc. of the SPIE V. 2071, pp. 59–65.

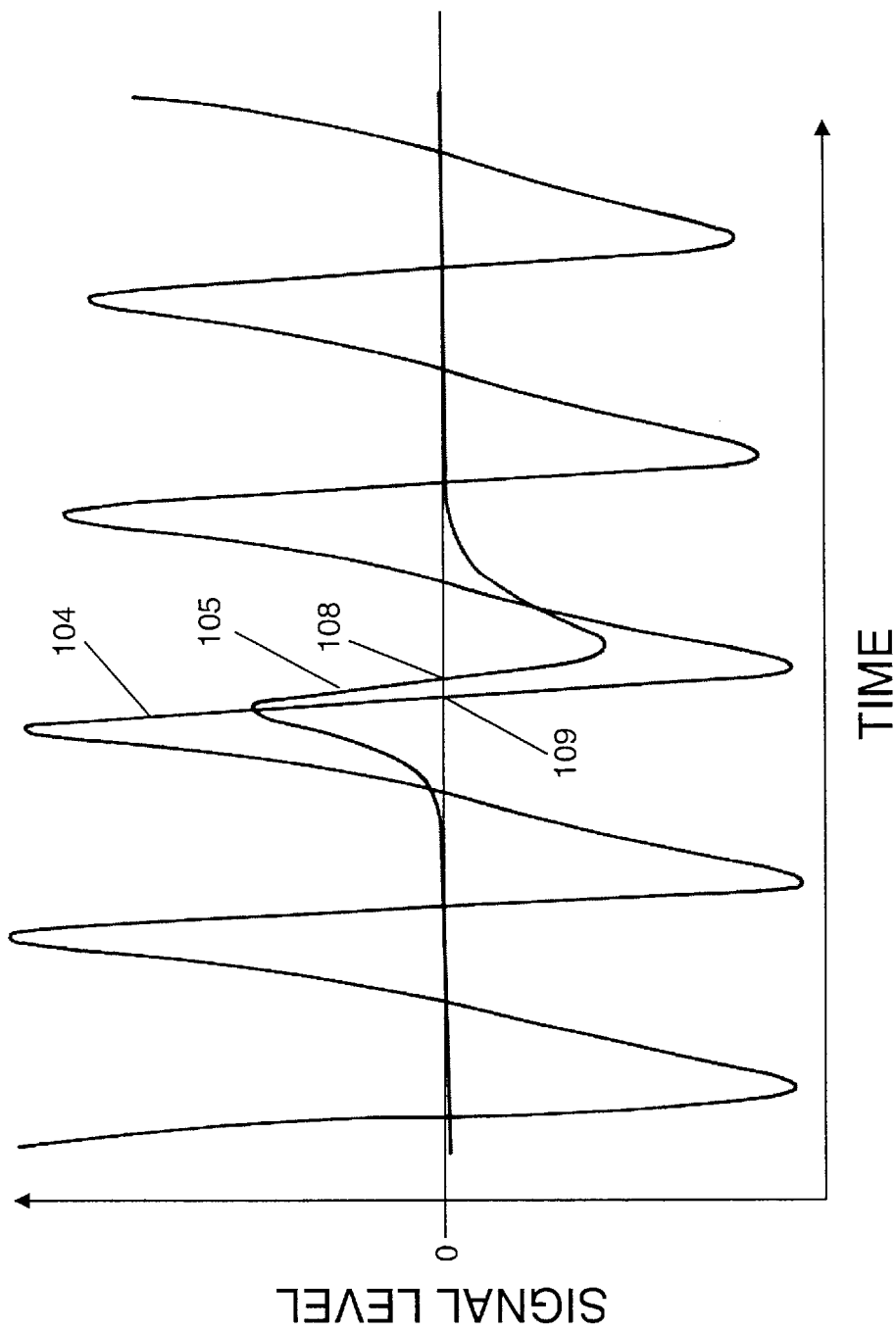

REFERENCE SYSTEM FOR OPTICAL DEVICES INCLUDING OPTICAL SCANNERS AND SPECTRUM ANALYZERS

CROSS-REFERENCE TO RELATED APPLICATIONS

This application takes priority under 35 USC § 119 (e) to U.S. provisional applications Ser. No. 60/031,562, filed Dec. 3, 1996 and Ser. No. 60/028,517 filed Oct. 18, 1996 which are both incorporated in their entirety by reference herein.

FIELD OF THE INVENTION

This invention relates generally to devices and methods for the measurement of wavelengths of light and more particularly to a reference system utilizing the output of an in-fiber Bragg grating and a fixed fiber Fabry-Perot filter as references for measuring wavelengths of light. The invention provides devices and methods for calibrating optical spectrum scanners as well as calibrated optical spectrum scanners and analyzers. The referencing system provides multiwavelength references over the scanning range. These devices and methods are of particular use in sensor systems, particularly in strain sensors, and for wavelength demultiplexing systems.

BACKGROUND OF THE INVENTION

Fixed fiber Fabry-Perot (fixed FFP) filters can be used as accurate wavelength ($\lambda$) references for the calibration of optical spectrum analyzers (OSA) to increase both accuracy and resolution of measurements. Although fixed FFP filters produce multiple, very accurately spaced, wavelengths (i.e. a comb of peaks), a consistent problem has been the difficulty of accurately identifying an individual wavelength among the multiple wavelengths produced.

Fiber Fabry-Perot tunable filters (FFP-TF) have been successful commercialization for use in he first wavelength detection multiplexing (WDM) systems and have demonstrated robust and field-worthy operation. WDM systems have rapidly developed moving to 8, 16 and 32 (and higher) wavelength systems using other less expensive demultiplex technology. These developments have made interrogator systems for accurately measuring the wavelength response of passive fiber optics devices possible. Tunable FFP filters can be used as the needed OSA component in such dense WDM, if suitable methods for $\lambda$ referencing and calibration can be found. For dense WDM systems, the accuracy of absolute $\lambda$ measurements is preferably about 0.5 to about 0.1 nm or higher, power measurements are preferably about 0.1 dB and signal-to-noise measurements are preferably about 1 dB or less. Fixed FFPs and FFP-TFs are described, for example, in U.S. Pat. Nos. 5,212,745; 5,212,746; 5,289,552; 5,375,181; 5,422,970; 5,509,093 and 5,563,973, all of which are incorporated by reference in their entireties herein, particularly for their disclosure of the structures and operation of these filters.

In-fiber Bragg gratings (FBGs) have been used led to the use of fiber optic sensors for strain and temperature measurements. See, for example, U.S. Pat. No. 4,996,419 (Morey) issued Feb. 26, 1991; U.S. Pat. No. 5,380,995 (Udd et al.) issued Jan. 10, 1995 U.S. Pat. No. 5,397,891 (Udd et al.) issued Mar. 14, 1995; U.S. Pat. No. 5,591,965 (Udd) issued Jan. 7, 1997. FBGs can be employed to form in-fiber lasers which can be used for sensing applications as described in U.S. Pat. No. 5,513,913 (Ball et al.) issued May 7, 1996. These sensing techniques depend on the ability to accurately measure the wavelengths of light reflected or transmitted by FBGs in a sensor fiber. A number of sensing system configurations have been developed. See, for example, U.S. Pat. No. 5,361,30 (Kersey et al.) issued Nov. 1, 1994 and U.S. Pat. No. 5,410,404 (Kersey et al.) issued Apr. 25, 1995; A. D. Kersey et al. (1993) "Multiplexed fiber Bragg grating strain-sensor system with a fiber Fabry-Perot wavelength filter." Optics Letters 18(16):1370; E. J. Friebele et al. (1994) "Fiberoptic Sensors measure up for smart structures" Laser Focus World (May) pp. 165–169; A. D. Kersey et al. (1995) "Development of Fiber Sensors for Structural Monitoring" SPIE 2456:262–268 (0-8194-1809-9/95); A. D. Kersey (1996) "Interrogation and Multiplexing Techniques for Fiber Bragg Grating Strain-Sensors" Optical Sciences Division Naval Research Laboratory (NRL) code 5674 distributed by NRL at SPIE Meeting Fall 1996 (Denver, Co.); U.S. Pat. No. 5,426,297 (J. R. Dunphy et al.) issued Jun. 20, 1995; Y.-j. Rao and D. A. Jackson (1996) "Universal Fiber-Optic Point Sensor System for Quasi-Static Absolute Measurements of Multiparameters Exploiting Low Coherence Interrogation." J. Lightwave Technol. 14(4):592–600; Y.-j. Rao et al. (1996) "Strain sensing of modem composite materials with a spatial/wavelength-division multiplexed fiber grating network." Optics Letters 21(9):683–685; and references cited therein.

Fiber Bragg gratings can produce a narrow-band response around a single wavelength (reflecting a narrow-band peak or passing the illuminating spectrum with a narrow-band notch or hole). Dopants used to increase the index of refraction in the cores of optical fibers are photosensitive. By exposing a single-mode fiber to interfering beams of UV light or through a suitable mask, a diffraction pattern can be written into the core that reflects a single narrow-band wavelength of light. The resulting fiber Bragg grating (FBG) passes all other wavelengths carried by the single-mode fiber and reflects almost all (up to 99.9%) of the light that meets the Bragg condition ($\lambda=2s$, the Bragg reflection wavelength), where s is the spacing of the grating. If the FBG is mounted on a structure (typically a structure much larger than the grating itself), then the spacing of the grating and the corresponding reflected wavelength of the FBG are affected by and can be used to sense strain, temperature, pressure, etc. in the structure depending on the mounting configuration. A sensor system is constructed by creating a number of FBGs (typically each of different Bragg wavelength) spaced along a single optical fiber to generate a highly multiplexed sensor system reflecting at different wavelengths. Sensor systems can also be constructed in which multiple FBGs (of different wavelength) are created in the same location on the fiber.

FBGs have recently become widely commercially available at relatively low cost and are projected to be extensively used in multiwavelength telecommunications systems. Thus, there is a growing need for devices and methods for interrogation of sensor, telecommunication and related systems that employ FBGs. In particular, there is a need for devices and methods that provide precise, accurate and reproducible determination of wavelengths reflected (or alternatively of the notches transmitted) by FBGs.

Wavelength sensing to sub-picometer levels can be accomplished with fiber Fabry-Perot tunable filters (FFP-TFs). In particular, the all fiber, lenseless FFP-TF is mechanically robust, when appropriately temperature compensated operates with little temperature variation from −20° C. to +80° C. and has a reliability record in the field of less than 500 FITS (failure interval times). However, the cost, size, power consumption of the control circuitry and the need for one FFP-TF per wavelength has precluded their use in dense multi-wavelength telecommunication systems; rather, FBGs have found widespread application as dense demultiplexing elements for such systems.

FFP-TFs used as scanning interferometers can sense extremely small wavelength shifts due to high mechanical resolution of the piezoelectric actuators (PZTs) used for tuning the multipass dual mirror optical cavity. Early work in using FFP-TFs for measuring wavelength shifts in reflected FBGs lacked wavelength references for long-term stability, and used rudimentary software control. See: A. D. Kersey et al. (1993) supra; E. J. Friebele et al. (1994) supra; A. D. Kersey et al. (1995) supra; A. D. Kersey (1996) supra.

FIG. 1 is a block diagram of an exemplary interrogator system. A subject light source 1 is optically coupled (optical coupling is indicated by heavy lines in all the block diagrams) through a 1×2 splitter 2 to a reference fiber Bragg grating (FBG) 3, optionally housed in a controlled temperature environment 4, and to unknown wavelength FBGs 12, 13 and 14. Splitter 2 is also optically coupled to scanner 20 comprising tunable fiber Perot filter (FFP-TF) 21, photodetector 22, differentiator 23, zero-crossing detector 24, piezoelectric transducer (PZT) 25, sweep generator 26, counter 27, clock 28 and data latch 29. Splitter 2 is optically coupled through tunable fiber Perot filter (FFP-TF) 21 to photodetector 22. Photodetector 22 is electrically coupled through differentiator 23 and zero-crossing detector 24 to data latch 29. Clock 28 is electrically coupled to counter 27 which is in turn electrically coupled through sweep generator 26 to PZT 25. PZT 25 is mechanically coupled to FFP-TF 21. Sweep generator 26 and data latch 29 are electrically coupled to computer 40.

In operation, broad spectrum light from subject light source 1 is coupled through splitter 2 and illuminates FBGs 3, 12, 13 and 14. Light at the specific wavelengths of each of the FBGs is reflected back through splitter 2 and a portion of the reflected light is coupled to FFP-TF 21. Light at the wavelength to which FFP-TF 21 is tuned is passed through to detector 22. Electronic clock 28 supplies a pulse train to operate counter 27 which generates a numeric value n that is proportional to time. The numeric value n in counter 27 is passed to sweep generator 26 which provides to PZT 25 a sweep signal proportional to n. PZT 25 then produces a mechanical motion, in response to the sweep signal, which tunes FFP-TF (by changing the FFP cavity length) to wavelengths related, approximately linearly, to the numeric values n in counter 27. Counter 27 supplies its numeric values also to data latch 29. In typical operation, counter 27 is reset and then counts pulses from clock 28 in a linear fashion with respect to time. Sweep generator 26 generates a linear sweep voltage ramp v from the numeric values n supplied by counter 27 and applies it to PZT 25 which in turn applies an approximately linear motion to FFP-TF 21. As FFP-TF 21 sweeps across the wavelength spectrum, the light reflected by each of the FBGs appears at the input to photodetector 22 at a particular time t and a particular numeric value n. Photodetector 22 produces an electrical signal h which is proportional to the intensity of the light striking it. This is illustrated in FIG. 11 which is a plot of h 103 and a plot of v 101 versus t (or n.) Differentiator 23 produces a signal dh/dt (or dh/dn) which has a zero-crossing at each wavelength λ where an FBG produces a maximum reflection. This is illustrated in FIG. 14 which is a plot of dh/dt versus t (proportional to n). The signal dh/dt is supplied to zero-crossing detector 24 which produces a zero-crossing signal coincident with the zero-crossing of dh/dt. The zero-crossing signal is applied to data latch 29 which captures the value of n when each zero crossing occurs. Computer 40 asynchronously interrogates data latch 29 via latch control lines 31 and receives the stored values of n where the zero crossings occurred over data lines 32. Computer 40 also provides control signals and quiescent bias data to sweep generator 26, and in turn to counter 27, via sweep control lines 33.

By the process just described, a relationship, between the counter values n and the wavelengths λ at which peak reflections from fiber Bragg gratings (FBGs) occur, can be obtained.

The FBG interrogator of FIG. 1 can operate at 1520 nm to 1570 mn (the main telecommunications window where most FBGs are used) with very high resolution (1 μstrain) for short-term mechanical sensing. A standard pigtailed LED can provide sufficient broadband power to illuminate up to 32 gratings (FBGs) and a sensitive zero crossing detector can detect wavelength shifts of a few tenths of a picometer over a 50 nm wavelength window. However, wavelength drifts which were many times greater than the sub-μstrain resolution were observed in this high wavelength resolution system, demonstrating the need for high accuracy wavelength references. The difficulty lies in the calibration of the instrument with sufficient accuracy to measure the very small changes in wavelengths produced by changes in the strain on a fiber or to make measurements of wavelengths to very tight tolerances.

In the system of FIG. 1, the reference FBG provides only one point of reference in a plot of h versus n. FFP-TFs and PZTs are not perfectly linear and therefore a means of providing multiple reference points over the wavelength spectrum of interest is necessary to ensure accuracy across the spectrum. An object of the invention is to provide a reference system with multiple calibrated reference points across a wavelength spectrum for accurate calibration of interrogation systems such as that of FIG. 1.

SUMMARY OF THE INVENTION

The invention is a reference system for an optical wavelength scanner or optical spectrum analyzer used for measuring or identifying the wavelengths of radiation emitted or reflected by optical devices. The reference system combines a fixed fiber Fabry-Perot (fixed FFP) filter, which produces a number of very accurately spaced wavelengths (hereinafter referred to as a comb), with a fiber Bragg grating (FBG) which produces a reference wavelength for use in identifying the wavelengths of the peaks produced by the fixed FFP filter. The invention provides interrogator systems, particularly for FBG-based sensor systems, and optical spectrum analyzers employing the inventive reference system. The invention provides sensing and wavelength interrogation methods employing the reference system and methods of calibrating optical wavelength scanners, optical spectrum analyzers and related wavelength measuring devices employing the reference system. The invention also provides a method of using a calibrated narrow band light source (e.g., a narrow band laser source) to calibrate the fixed FFP filter and the reference fiber Bragg gratings used in the systems of this invention.

The reference system comprises an optical path for connecting to a scanner and two optical branches, a measurement branch containing the device (or devices) being tested (i.e., by measuring or identifying the wavelength generated by the device) and a reference branch containing the fixed FFP filter. In operation, the reference and measurement branches are periodically illuminated preferably using a broad band light source (when the reference branch is illuminated (i.e., during a reference illumination period) the measurement branch is not, and when the measurement branch is illuminated (i.e., during a measurement illumination period, the reference branch is not) and, in specific embodiments, the branches are alternately illuminated. During each illumination period, an FFP tunable filter, located in the scanner and coupling light from either branch (dependent upon which branch is being illuminated) to a photodetector, is swept (or scanned) across the wavelength band of interest. A single scan or multiple scans can be performed during a given illumination period. As the FFP-TF sweeps across the wavelength band, the wavelengths at which peaks (or notches) in the detector output occur are logged by the system. Since the fixed FFP filter and the device(s) under test are periodically illuminated, the reference and measurement branches are scanned independently of each other. However, the individual scans of the FFP-TF are identical during the measurement and the reference illumination periods and therefore the peaks in the output of the device under test can be located by interpolation between the peaks of fixed FFP filter. The illumination periods of the reference and measurement branches need not be the same length and need not extend for the same number of filter scans. The branches can, however, be alternatively illuminated on alternate scans of the tunable FFP. In a noise limited system, alternate illumination of the branches on alternate scans of the tunable filter is preferred. The location of, and the separation between, the peaks of the fixed FFP filter are determined by calibration. However, after calibration, identifying a particular peak as a known reference among the many closely spaced teeth of the comb of peaks along the sweep can be extremely difficult. Therefore, a reference fiber Bragg grating (FBG), located in either the measurement branch or in the reference branch, is used to provide a single wavelength peak or notch, respectively, to positively identify (or tag) a particular one of the peaks from the fixed FFP filter as a known reference. Normally, the wavelength of the reference FBG peak is known to be located somewhere between two particular peaks from the fixed FFP filter (alternatively the reference FBG peak can be selected to coincide in wavelength with one of the FFP peaks) and hence can be used to identify the wavelength of a peak in the FFP filter comb.

The reference system of this invention can be combined with a variety of tunable filters to determine wavelengths reflected or transmitted by FBGs or wavelengths generated, emitted or reflected by other optical device elements or wavelength sources.

BRIEF DESCRIPTION OF THE DRAWINGS

FIG. 18 is an expanded view of FIG. 16 showing the derivative plot of the third FBG.

DESCRIPTION OF THE PREFERRED EMBODIMENTS OF THE INVENTION

Figure 1:
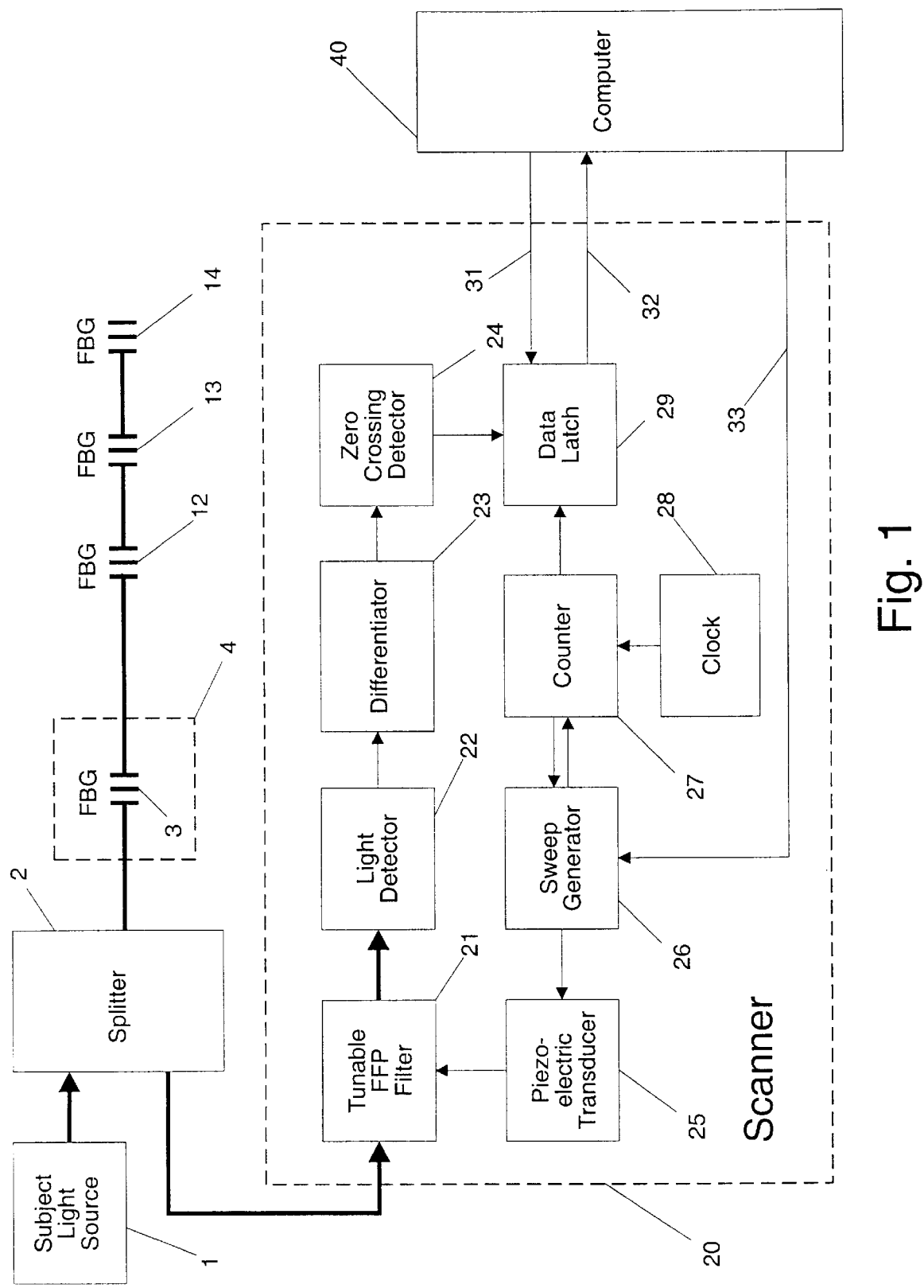
FIG. 1 is a block diagram of an exemplary wavelength interrogation system without the reference system of this invention.

As commonly used and used herein, in addition to its literal definition, the term wavelength is used in context to mean radiation, or a peak or notch in radiation intensity, at a particular wavelength (e.g., "the device produces a wavelength of 1510 nm"). The term "resonant wavelength" refers to the wavelength at which a peak occurs in the output of an FFP filter. The term "Bragg wavelength" refers to the wavelength at which a peak or notch occurs in the reflected or transmitted spectral output, respectively, of an FBG. Also, as used herein, the terms light and illumination are not limited to visible light but also include electromagnetic radiation in the infrared and ultraviolet spectra.

In the drawings, like reference numerals indicate like features; and, a reference numeral appearing in more than one figure refers to the same element. The drawings and the following detailed descriptions show specific embodiments of the invention. Numerous specific details including materials, dimensions, and products are provided to illustrate the invention and to provide a more thorough understanding of the invention. However, it will be obvious to one skilled in the art that the present invention may be practiced without these specific details.

Figure 2:
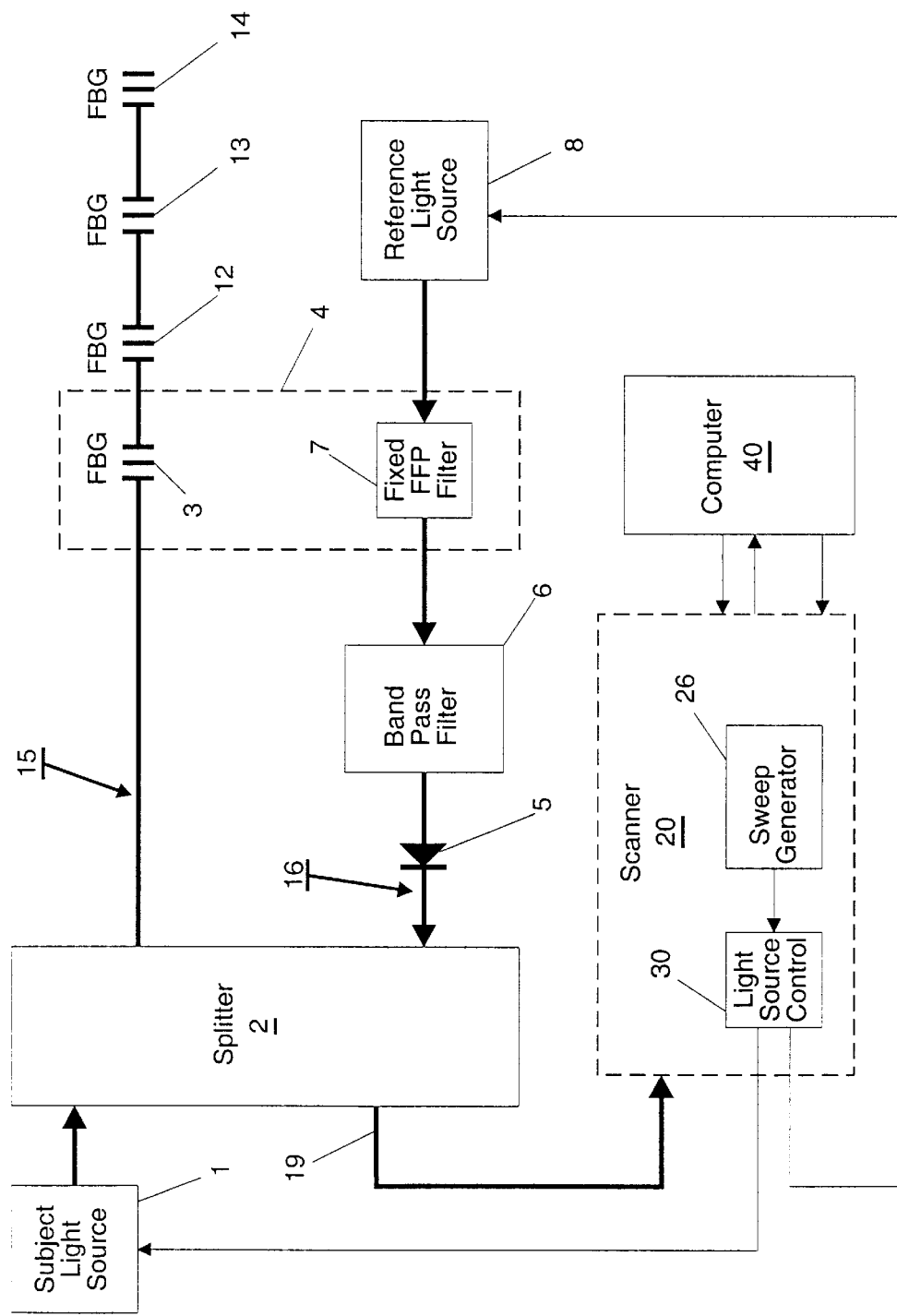
FIG. 2 shows a reflecting sensor system of this invention with the reference FBG in the measurement branch.

FIG. 2 is a block diagram of a first embodiment of the invention, a reflective FBG sensor. A subject light source 1 is optically coupled through splitter 2 to a reference fiber Bragg grating (FBG) 3, optionally housed in a controlled temperature environment 4 to provide for temperature stabilization, and to a plurality of FBGs of unknown wavelength (e.g., an arbitrary number of sensor FBGs) depicted here by the three FBGs 12, 13 and 14. A reference light source 8 is optically coupled through a fixed FFP filter 7 (which is optionally housed in controlled temperature environment to provide temperature stabilization), a bandpass filter 6, and an optical isolator 5 to splitter 2. In a preferred configuration, as shown in the figure, the fixed FFP filter is housed in the same temperature controlled environment as the reference FBG 3. Splitter 2 is also optically coupled to scanner 20 which is electrically coupled to computer 40. Scanner 20 now includes a light source control 30 connected to sweep generator 26. Light source control 30 is electrically coupled to subject light source 1 and to reference light source 8.

The therefor of FIG. 2 comprises an optical path 19 with two branches: measurement branch 15 and reference branch 16. The measurement branch 15 couples the devices whose wavelength is to be determined, in this case FBGs 12, 13 and 14, through splitter 2 to scanner 20. Reference branch 16 couples fixed FFP filter 7 (the precision reference), along with its supporting components, through splitter 2 to scanner 20.

Figure 11:
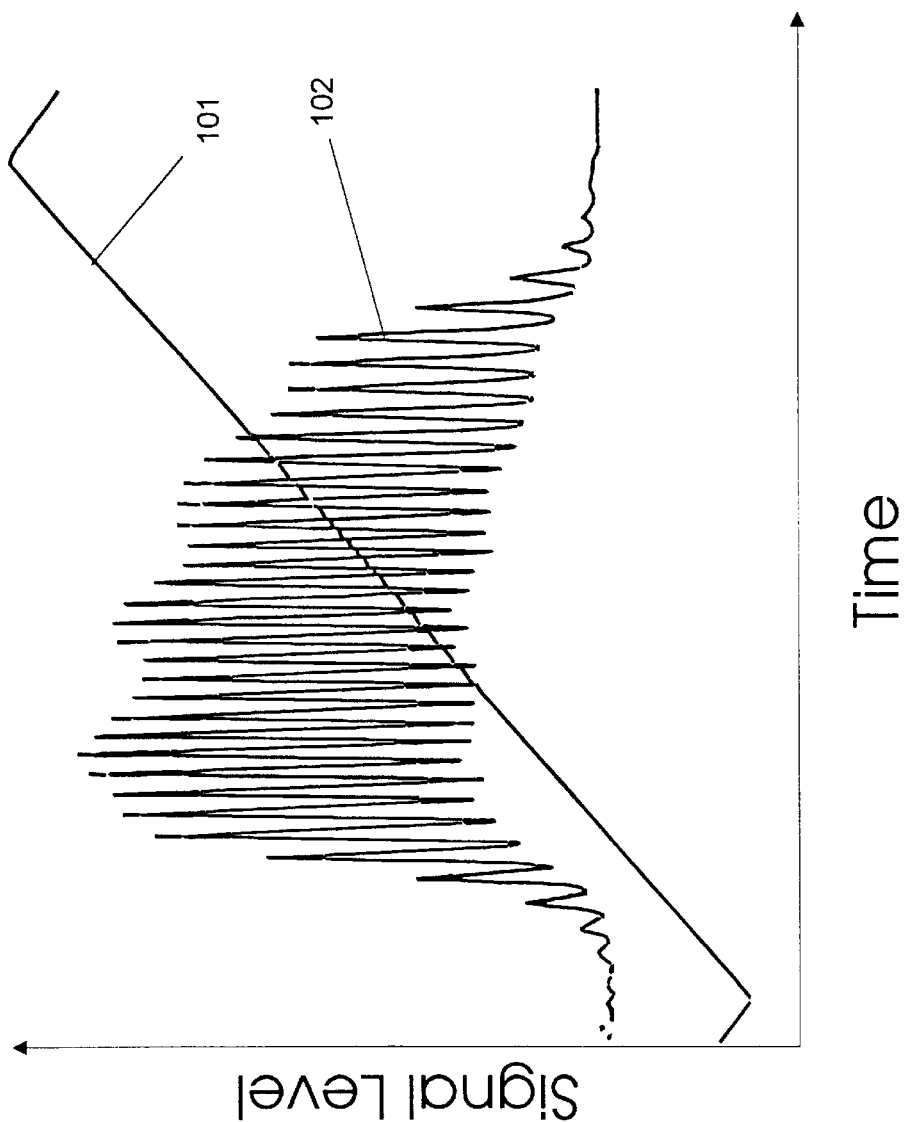
FIG. 11 is a plot of the wavelength response of an exemplary fixed FFP filter.
Figure 12:
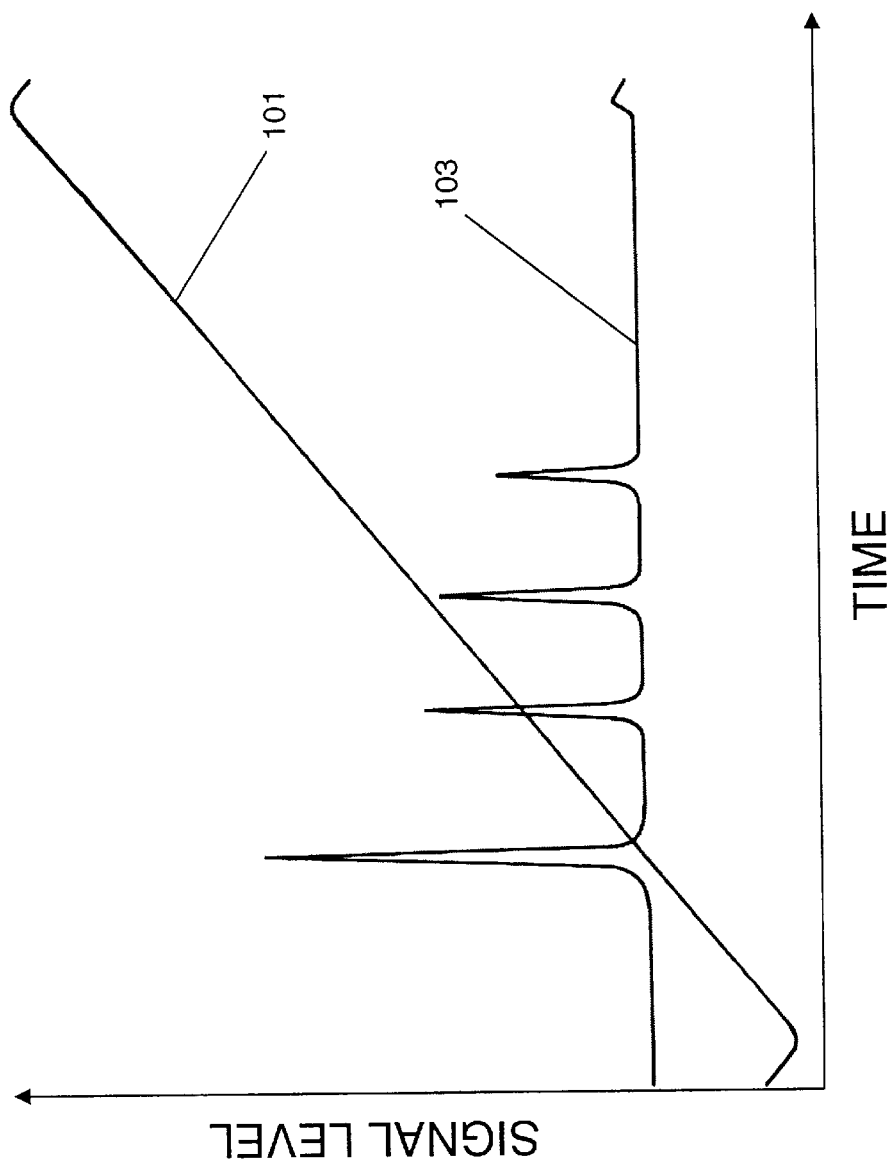
FIG. 12 is a plot of the wavelength response of an exemplary FBGs.
Figure 13:
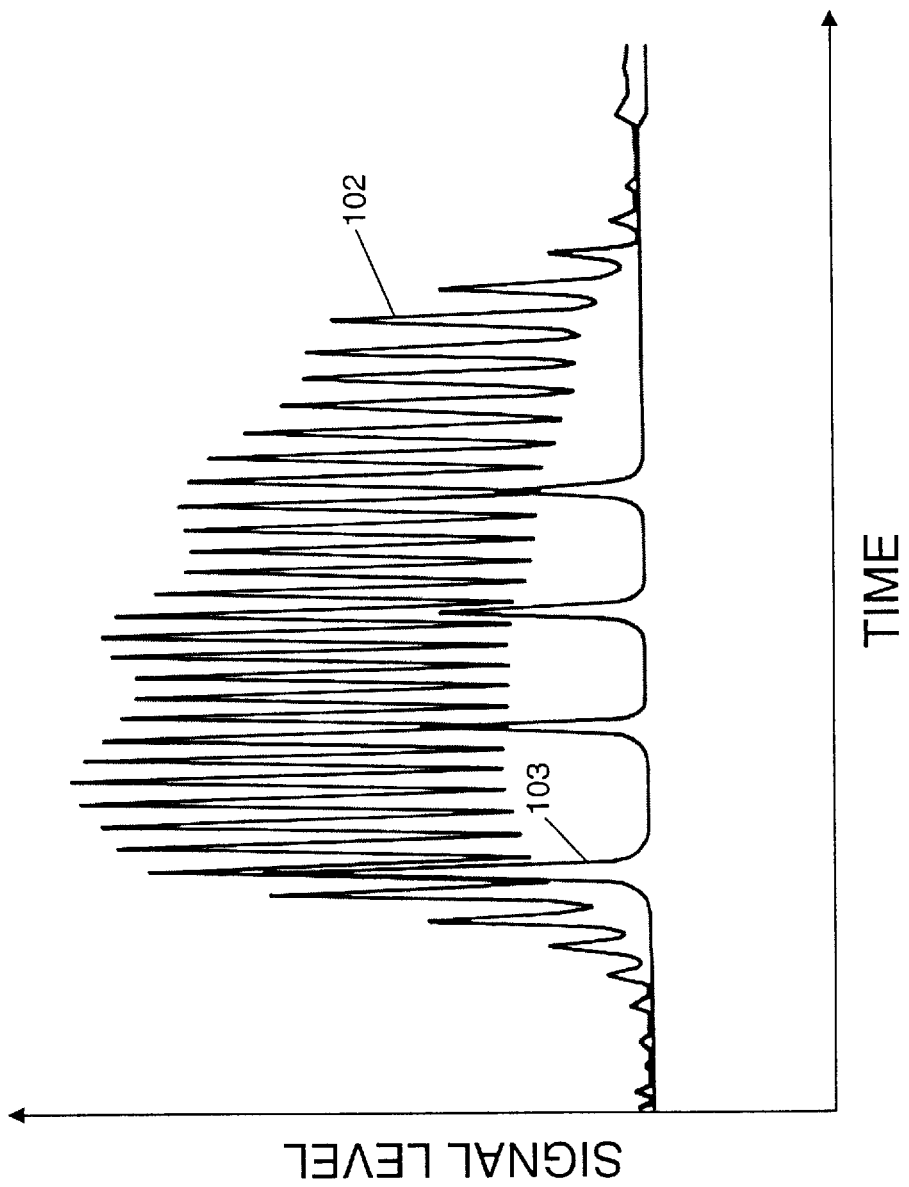
FIG. 13 is a superposition of the fixed FFP filter and FBG plots of FIGS. 11 and 12.
Figure 14:
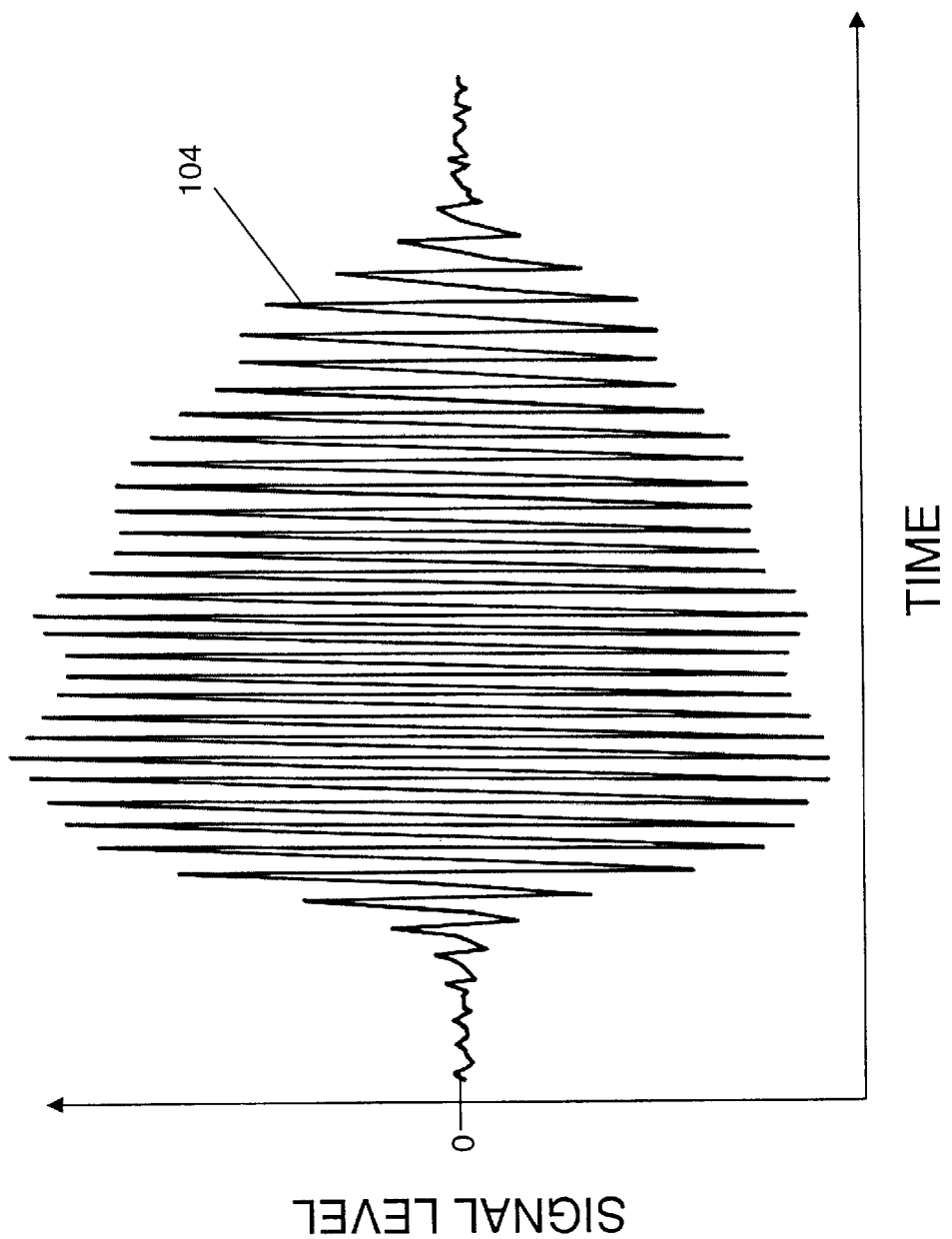
FIG. 14 is a plot of the derivative of the response of the fixed FFP filter.
Figure 15:
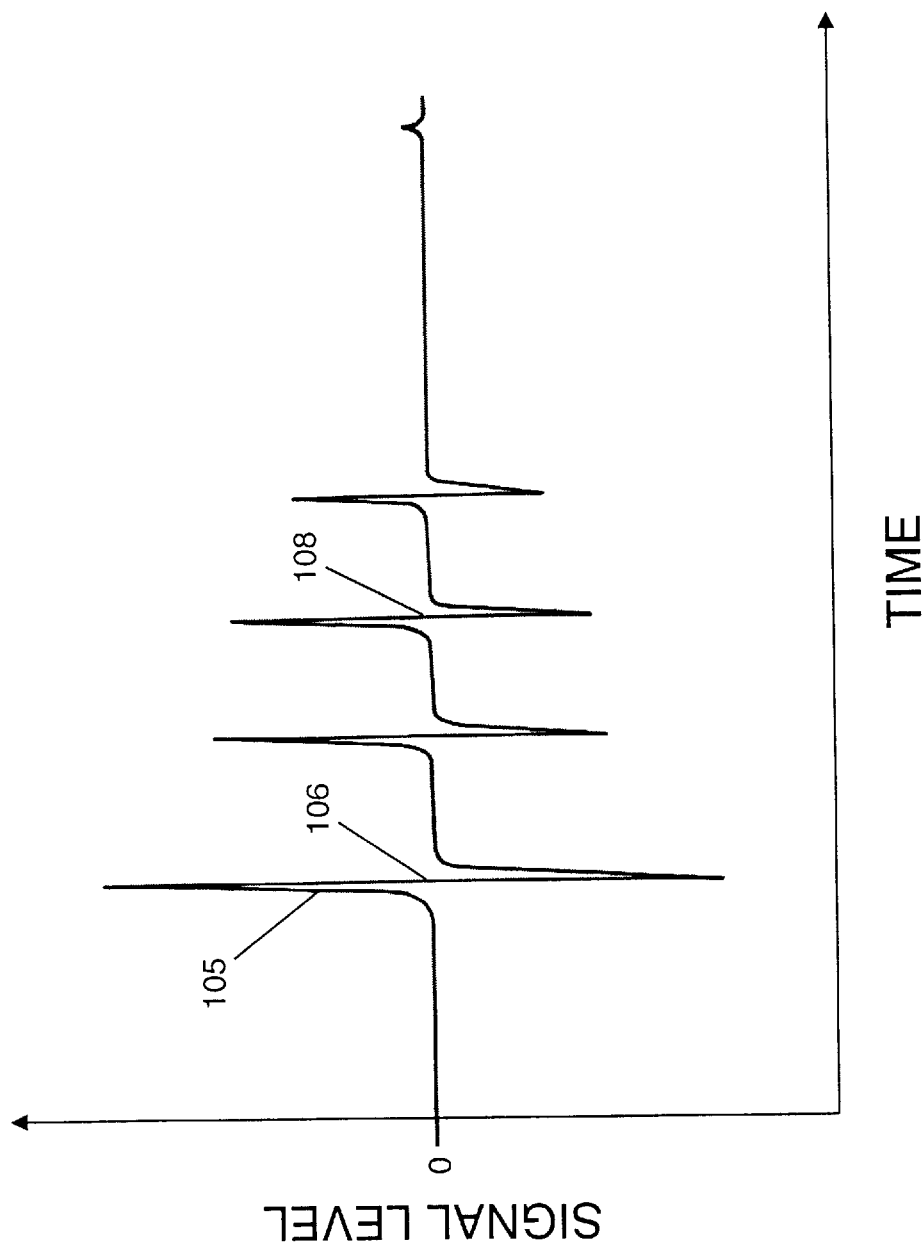
FIG. 15 is a plot of the derivative of the response of the FBGs.
Figure 16:
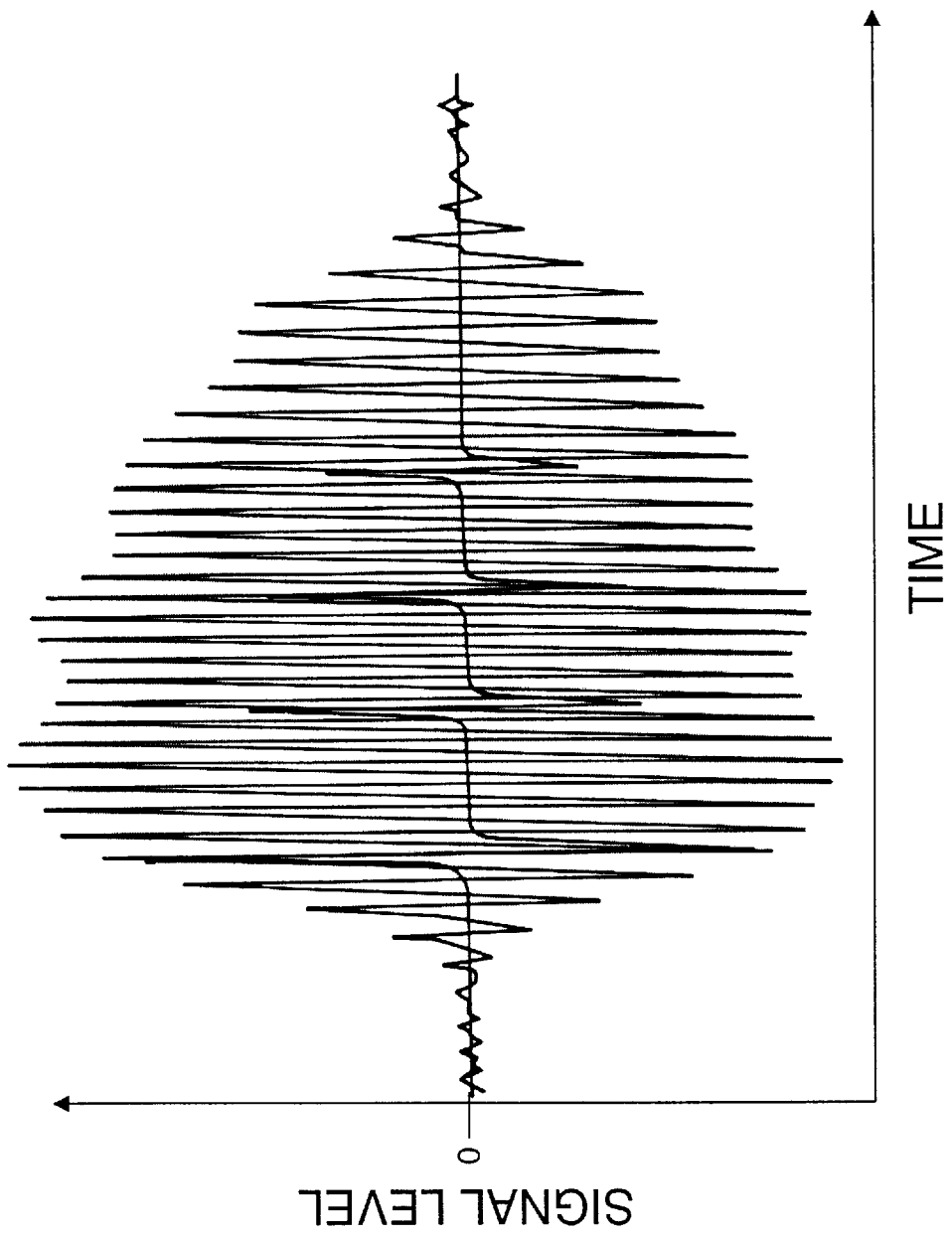
FIG. 16 is a superposition of the fixed FFP filter and FBG derivative plots of FIGS. 14 and 15.
Figure 17:
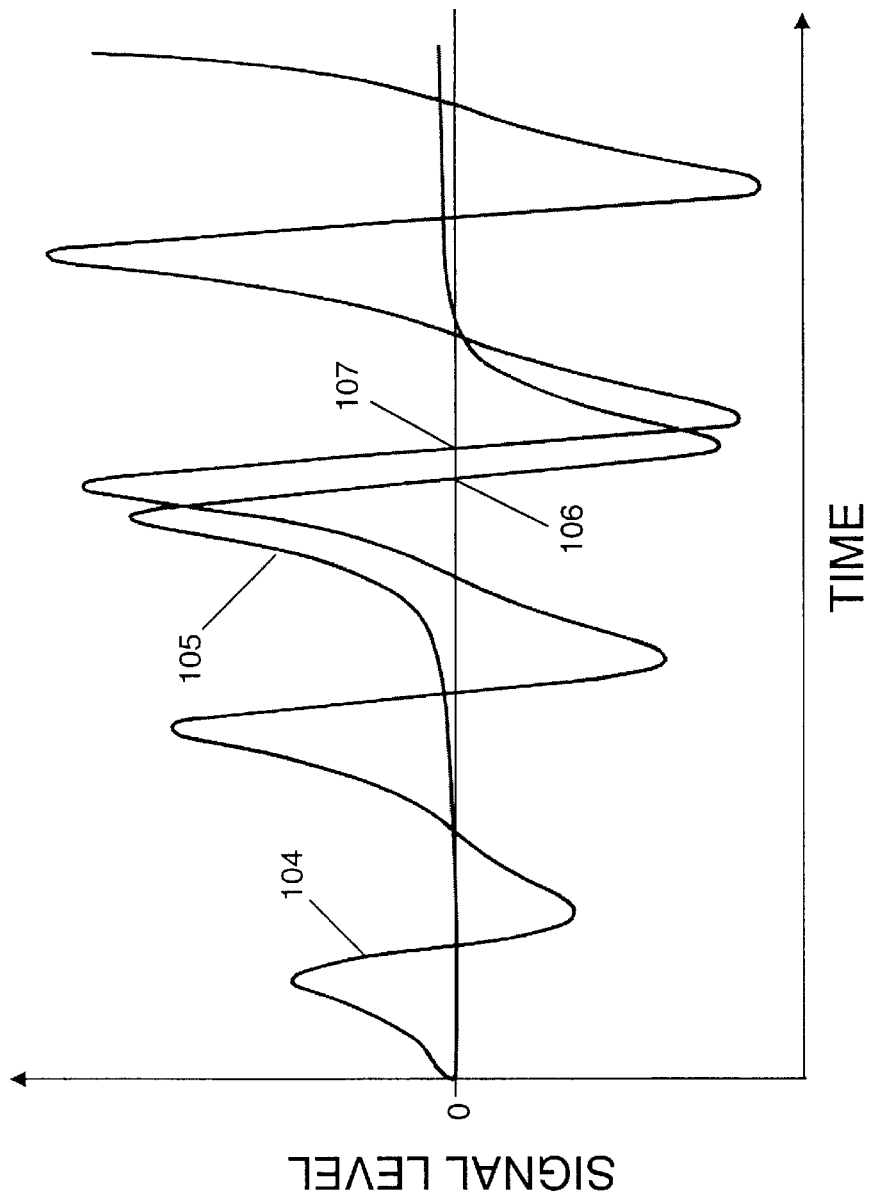
FIG. 17 is an expanded view of FIG. 16 showing the derivative plot of the first FBG.

In operation, only subject light source 1 or reference light source 8 can be on at one time. Sources 1 and 8 are switched on and off by light source control 30 in response to signals from sweep generator 26. When source 1 is on, the system functions as described previously for FIG. 1. During the time that source 1 is on, the scanner sweeps across the wavelength spectrum and the counter values n, corresponding to the wavelength λ for the reflection peak of each of the FBGs, are captured by data latch 29. When reference light source 8 is on, broad spectrum light from source 8 is coupled into fixed FFP filter 7 which transmits maximum light only at specific and precisely separated wavelengths. Light from filter 7 passes through bandpass filter 6 which passes light only within a wavelength spectrum of interest. Light from BPF 6 then passes through optical isolator 5 (which blocks reflected light from reentering FFP filter 7) and splitter 2 to scanner 20. While reference source 8 is on, the scanner again sweeps across the wavelength spectrum and this time the counter values n, corresponding to the wavelengths λ for each of the transmission peaks of fixed FFP filter 7, are captured by data latch 29. The transmission peaks of fixed FFP filter 7 (reference signal) are illustrated in FIG. 11 which is a plot of light intensity h 102 and a plot of sweep voltage v 101 versus time t (or counter values n). FIG. 12 illustrates the reflection peaks of the FBGs (subject signal) in a plot of h 103 vs. t. FIG. 13 is a superposition of the plots 102 and 103 showing the relationship of the subject and reference signals. FIGS. 14–16 illustrate the derivative signals dh/dn for the reference signal 104, the subject signal 105 and the superposition of the reference and subject signals, respectively. FIG. 17 is an expanded view in time of FIG. 16 showing the reference FBG zero crossing 106, from FBG 3, as used to identify the third zero crossing 107 from fixed FFP filter 7. The reduced amplitude of the fixed FFP signal 104 at the left side of trace is due to the rolloff of bandpass filter 6, the spectral response of the light source and the effect of other optical devices in the system. FIG. 18 is also an expanded view in time of FIG. 16 showing an unknown FBG zero crossing 108, from FBG 13, between two zero crossings 109 and 110 from fixed FFP filter 7. Since zero crossing 106 from FBG 3 was used to identify a particular zero crossing 107 (e.g., the third) from FFP filter 7, and data latch 29 stores a value of n for every filter 7 zero crossing thereafter, computer 40 can retrieve the data from latch 29 and count zero crossings of filter 7, from the one identified 107 to the unknown FBG zero crossing 108. The computer can then interpolate between two filter 7 zero crossings (109 and 110), one on each side of the unknown (108), to determine precisely the wavelength of the unknown.

Although the precise relationship between any counter value n and a corresponding wavelength λ of the tunable FFP filter 21 (FIG. 1) cannot be accurately predicted, by the use of a fixed FFP filter 7 to produce a comb of precisely located and separated references, and a reference FBG 3 to identify one tooth of the comb as a known reference, accurate measurements can be made by interpolating to compute the location of an unknown peak between two teeth of the comb (or coinciding with a comb peak).

Figure 3:
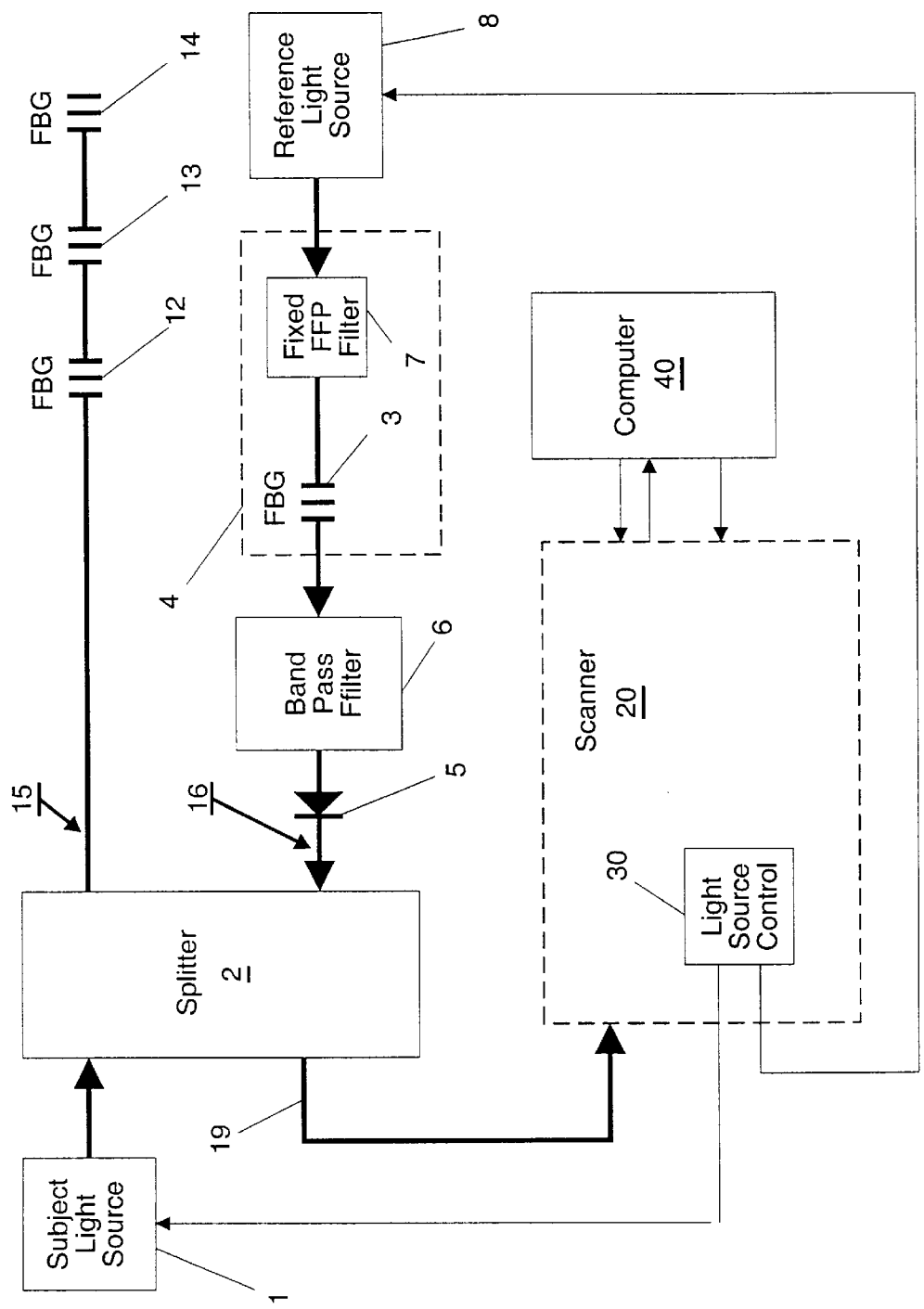
FIG. 3 shows a reflecting sensor system of this invention with the reference FBG in the reference branch.

FIG. 3 is a diagram of a second embodiment which is similar to that described above for FIG. 2 except that the reference FBG 3 is placed in reference optical branch 16 instead of measurement branch 15. FBG 3 is illustrated as located between fixed FFP filter 7 and bandpass filter 6. The reference FBG 3, the fixed FFP 7 and the bandpass filter can, however, be positioned in any order along the reference branch. The isolator should be placed at the end of the branch to avoid reflection into the branch. In this embodiment the reference light is transmitted through FBG 3 instead of reflected by it. A characteristic of FBGs is that, at their Bragg wavelengths, they reflect, and block the transmission of, light. The result is that, in this embodiment, the light applied to the scanner from the FBG is a broad spectrum with a notch or hole at the resonant wavelength of the FBG instead of a peak as in the case of FIG. 2. In other words, the reference spectrum now has a level or plateau with both a comb of peaks from FFP filter 7 and a notch from FBG 3. FBG 3 produces a notch at its resonant wavelength in the spectrum of wavelengths passed by FFP filter 7. Its location can be recognized by a zero-crossing of opposite sign from that of the peaks of the fixed FFP filter comb. Otherwise, operation of the system is essentially the same as described previously, except that the zero-crossing of the FBG now occurs at a notch instead of at a peak (and crosses zero in the opposite direction). This embodiment has the advantage that all references are located in the same optical branch and are illuminated by the same reference light source at the same time.

Figure 4:
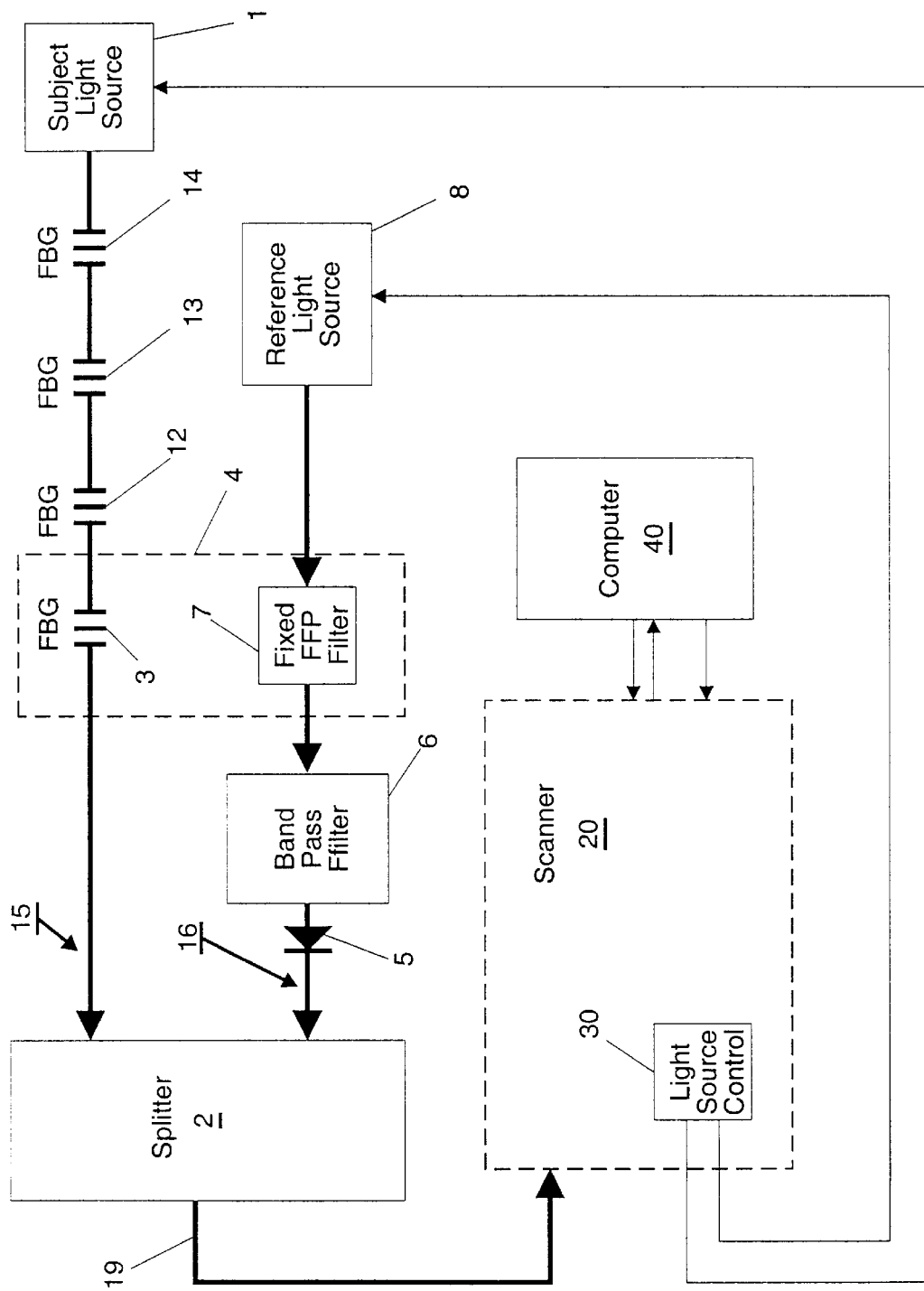
FIG. 4 shows a transmitting sensor system of this invention with the reference FBG in the measurement branch.

FIG. 4 is a diagram of a third embodiment which is also similar to that described above for FIG. 2 except that the subject light source 1 is coupled to FBG 14 instead of splitter 2. In this embodiment, the light analyzed is the light that is transmitted through the FBGs instead of the light reflected by them. The result is that the light applied to the scanner from the FBGs is a broad spectrum with notches at the Bragg wavelengths of the FBGs instead of peaks as in the case of FIG. 2. Otherwise, operation of the system is essentially the same, except that the FBG zero-crossings now occur at the notches instead of at the peaks (and cross zero in the opposite direction).

Figure 5:
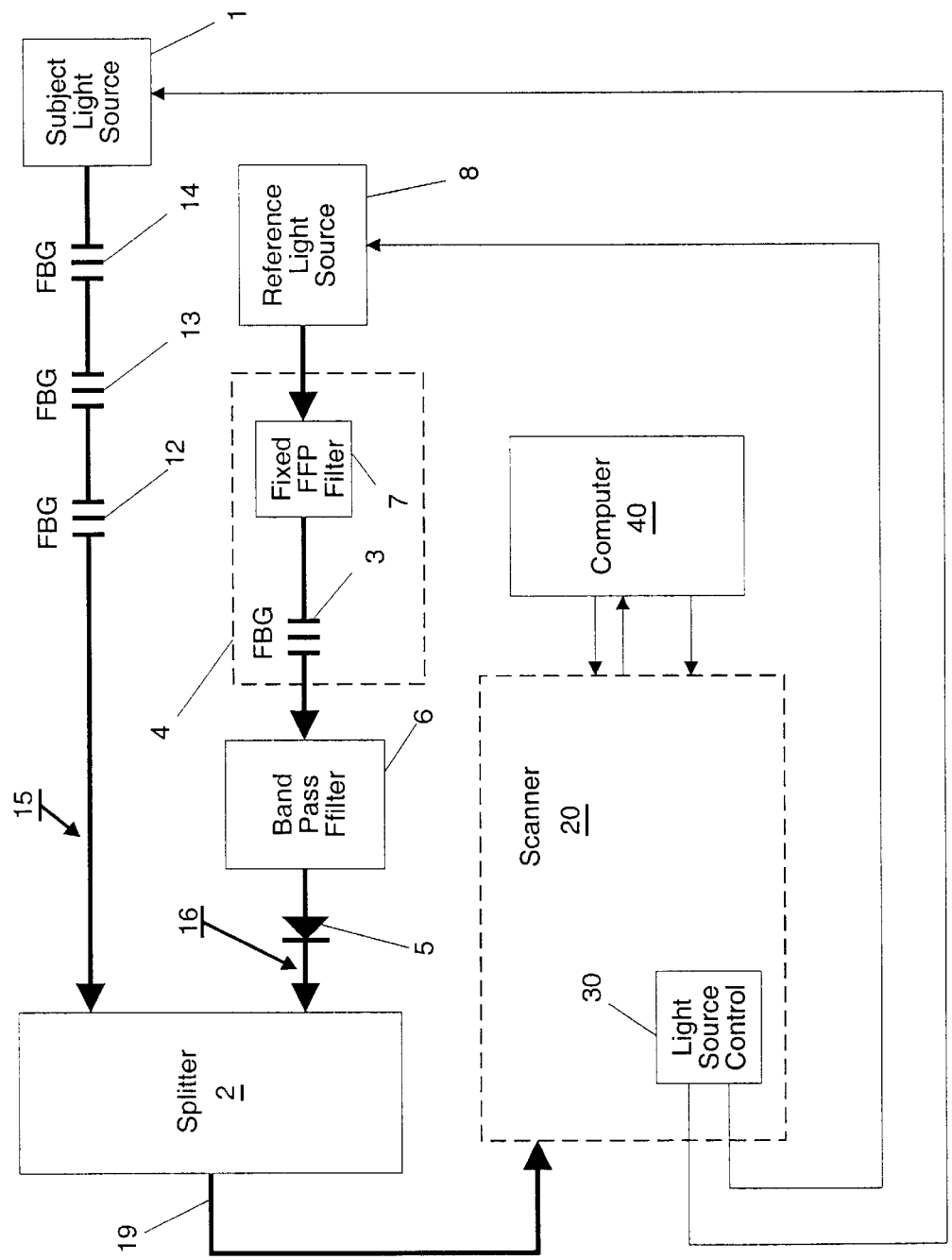
FIG. 5 shows a transmitting sensor system of this invention with the reference FBG in the reference branch.

FIG. 5 is a diagram of a fourth embodiment which is similar to that described above for FIG. 3, except that the subject light source 1 is coupled to FBG 14 instead of splitter 2. In this embodiment, as in FIG. 4, the light analyzed is the light transmitted through the FBGs. The result is that the light applied to the scanner from the subject FBGs is a broad spectrum with notches at the Bragg wavelengths of the FBGs, instead of peaks as in the case of FIG. 3. Operation of the measurement branch of the system is essentially the same as in FIG. 4 and the operation of the reference branch is as described for FIG. 3.

Figure 6:
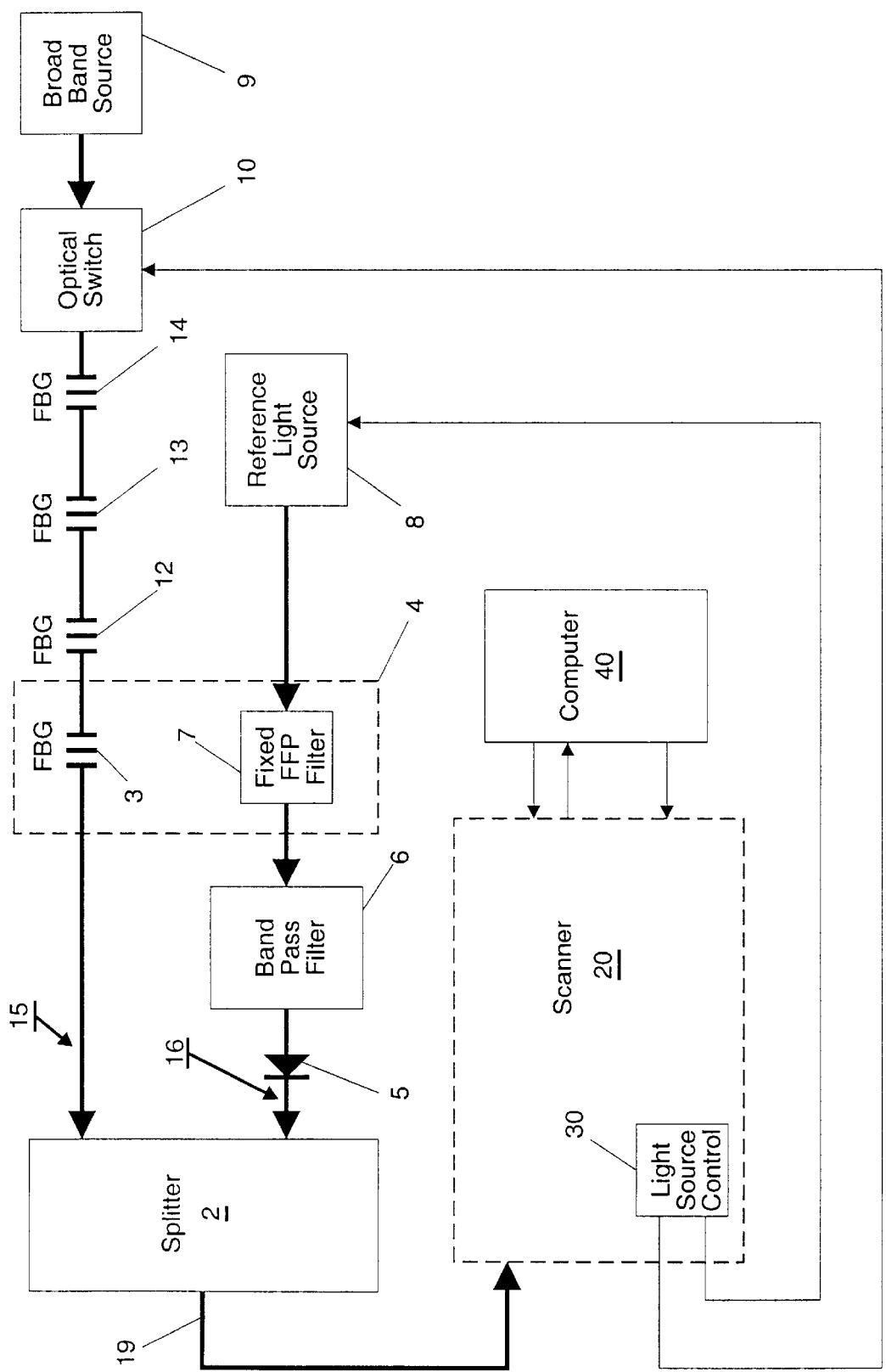
FIG. 6 shows a remote source system of this invention with the reference FBG in the measurement branch.

FIG. 6 is a diagram of a fifth embodiment which is similar to FIG. 4, except that an external (or uncontrolled) broad band light source 9 is used as the subject light source and an optical switch 10 is inserted between source 9 and FBG 14. This embodiment is functionally the same as in FIG. 4 except that light source control 30 now controls the illumination of the FBGs by actuating optical switch 10 instead of source 9.

Figure 7:
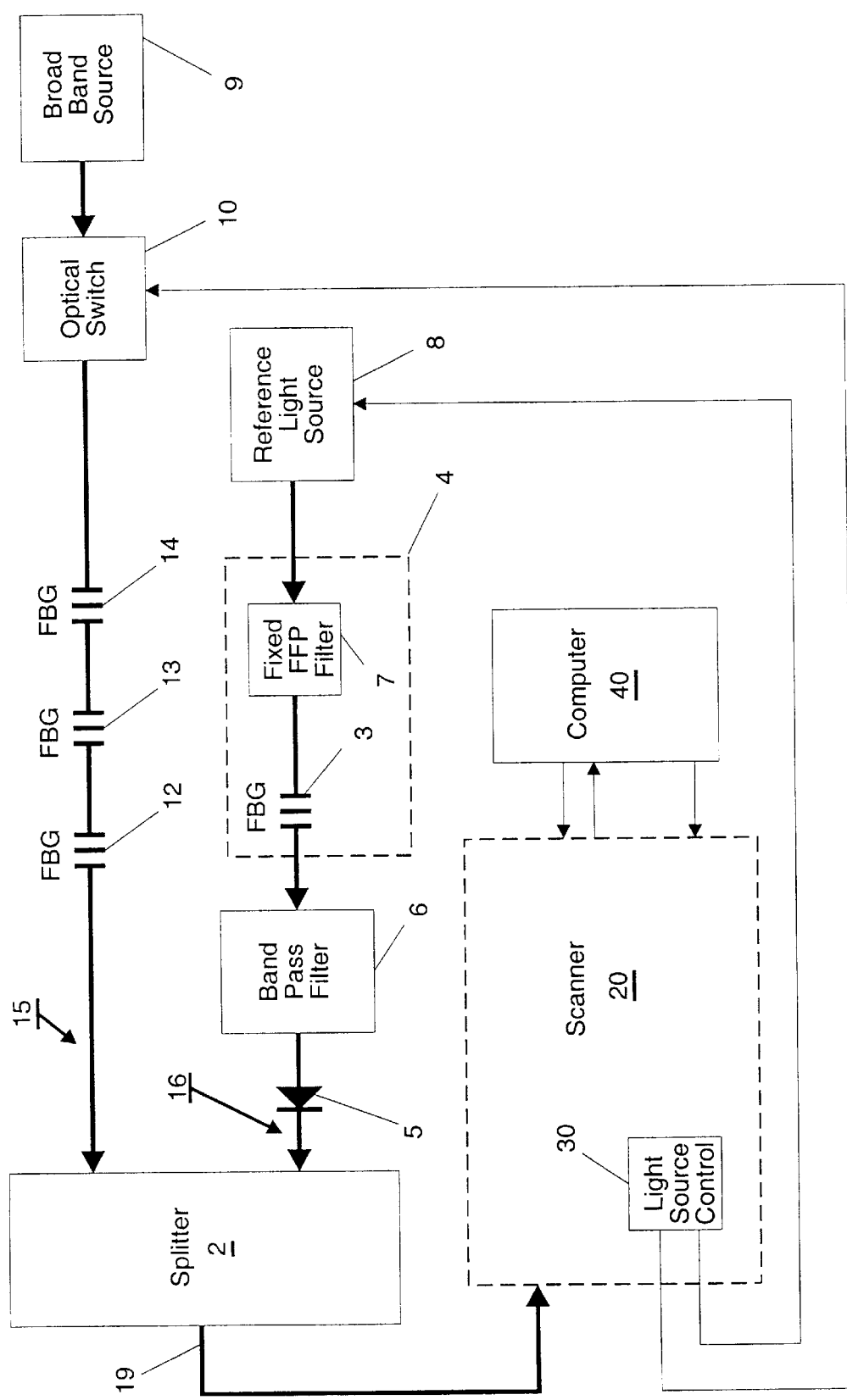
FIG. 7 shows a remote source system of this invention with the reference FBG in the reference branch.

FIG. 7 is a diagram of a sixth embodiment which is similar to FIG. 6 except that, as in FIGS. 3 and 5, the reference FBG 3 is placed in reference optical branch 16 instead of measurement branch 15. This embodiment is functionally the same as in FIG. 5, except that light source control 30 now controls the illumination of the FBGs by actuating optical switch 10 instead of source 9.

Figure 8:
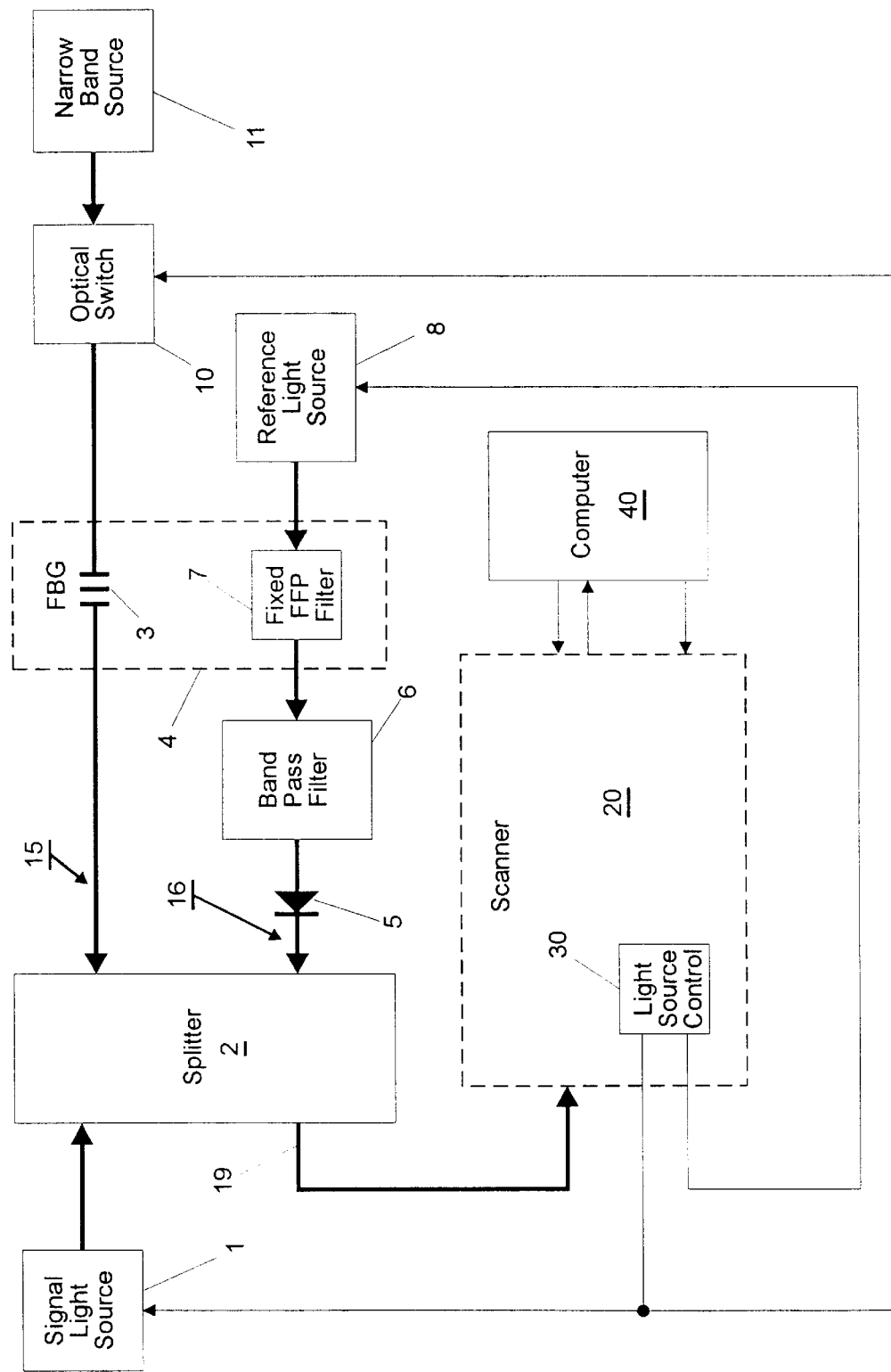
FIG. 8 shows a narrow source system of this invention with the reference FBG in the subject branch.

FIG. 8 is a diagram of a seventh embodiment in which an external source of narrow band wavelength light, indicated by narrow band source 11, can be measured, identified or used to calibrate the reference itself. For calibration, at least two narrow band wavelengths are required or a tunable wavelength source can be employed. This embodiment is similar to that shown in FIG. 6, except that only reference FBG 3 remains in the measurement branch and subject light source 1 is coupled to splitter 2 as in FIG. 2. In operation, subject light source 1 and optical switch 10 are activated at the same time on one alternate sweep (scan) of the tunable filter and reference light source 8 is activated during the other alternate sweep. Light from narrow source 11 and light reflected by FBG 3 are both seen by the scanner during the measurement scan. The reflection peak from FBG 3 is used to identify the reference peak from fixed FFP filter 7. The location of the peaks from two narrow sources 11 (or two peaks from a single wavelength tunable source, preferably separated by a significant difference in wavelength can then be measured and used to calibrate the references, by comparing their locations with the comb of peaks from FFP filter 7. This procedure allows calculation of the spacing of the peaks in the comb and determination of the reference wavelength of a peak.

Figure 9:
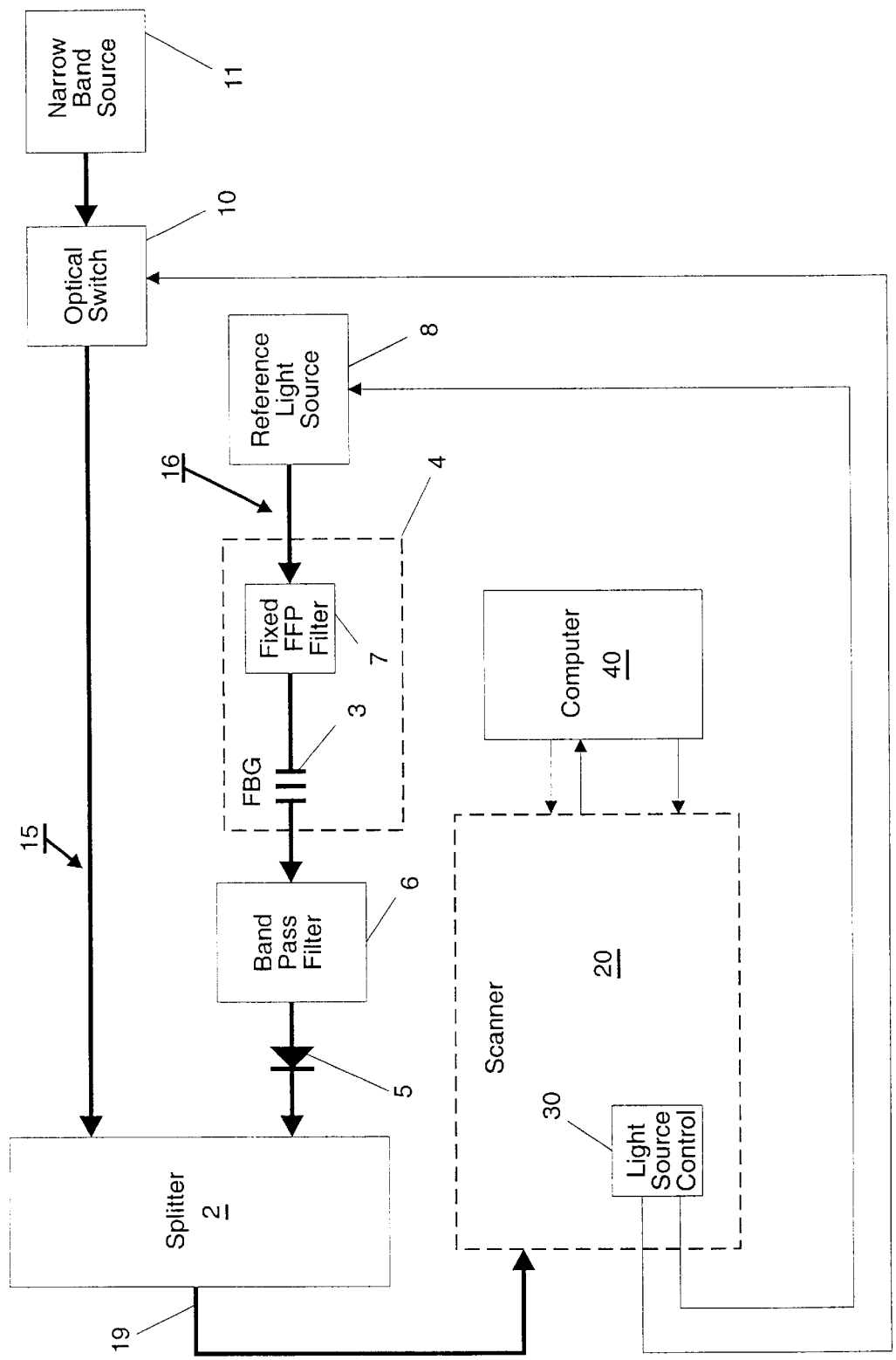
FIG. 9 shows a narrow source system of this invention with the reference FBG in the reference branch.

FIG. 9 is a diagram of an eighth embodiment which is similar to FIG. 7 except that all the FBGs are removed from measurement branch 15, FBG 3 is placed in reference branch 16 and broadband source 9 is replaced with a narrow band source 11 (or two narrow band sources or a tunable source that can generate at least two wavelengths, preferably separated by a significant wavelength, but within the wavelength range of interest, for calibration). Operation is essentially the same as in FIG. 8, but since reference FBG 3 is in the reference branch as in FIGS. 3, 5 and 7, subject light source 1 is not needed.

The embodiments described above for FIGS. 8 and 9 (in which two narrow band source wavelengths are employed) can be used to calibrate the reference system. The calibration method comprises using calibrated lasers (or other calibrated source) or a tunable laser as the narrow band source and utilizing the scanner to locate laser wavelength relative to the resonant wavelengths of the fixed FFP filter and the Bragg wavelength of the reference FBG. The calibration procedure is similar to the measurement of an unknown wavelength. A calibration signal, near the wavelength of the FBG is scanned and its counter position n located by interpolation relative to the reference FBG position and the nearest fixed FFP filter position. Then a calibrated wavelength near the opposite end of the spectrum of interest is scanned and its position is located by interpolation relative to the nearest fixed FFP filter position. Since the fixed FFP wavelengths, i.e., the teeth of the comb, are known to be equally spaced and the two calibrated wavelengths are known and located relative to two of the teeth, the wavelength of one tooth (arbitrarily designated the first tooth) and the wavelength spacing of all the teeth of the comb can be determined. And, since the position of the reference FBG relative to the first tooth is known, its wavelength can also be determined. In this way, the first tooth can always be identified by its position relative to the reference FBG and since its wavelength, and the separation in wavelength between all the teeth, are now known, the comb becomes a reference having a number of markers all at known wavelengths.

Figure 10:
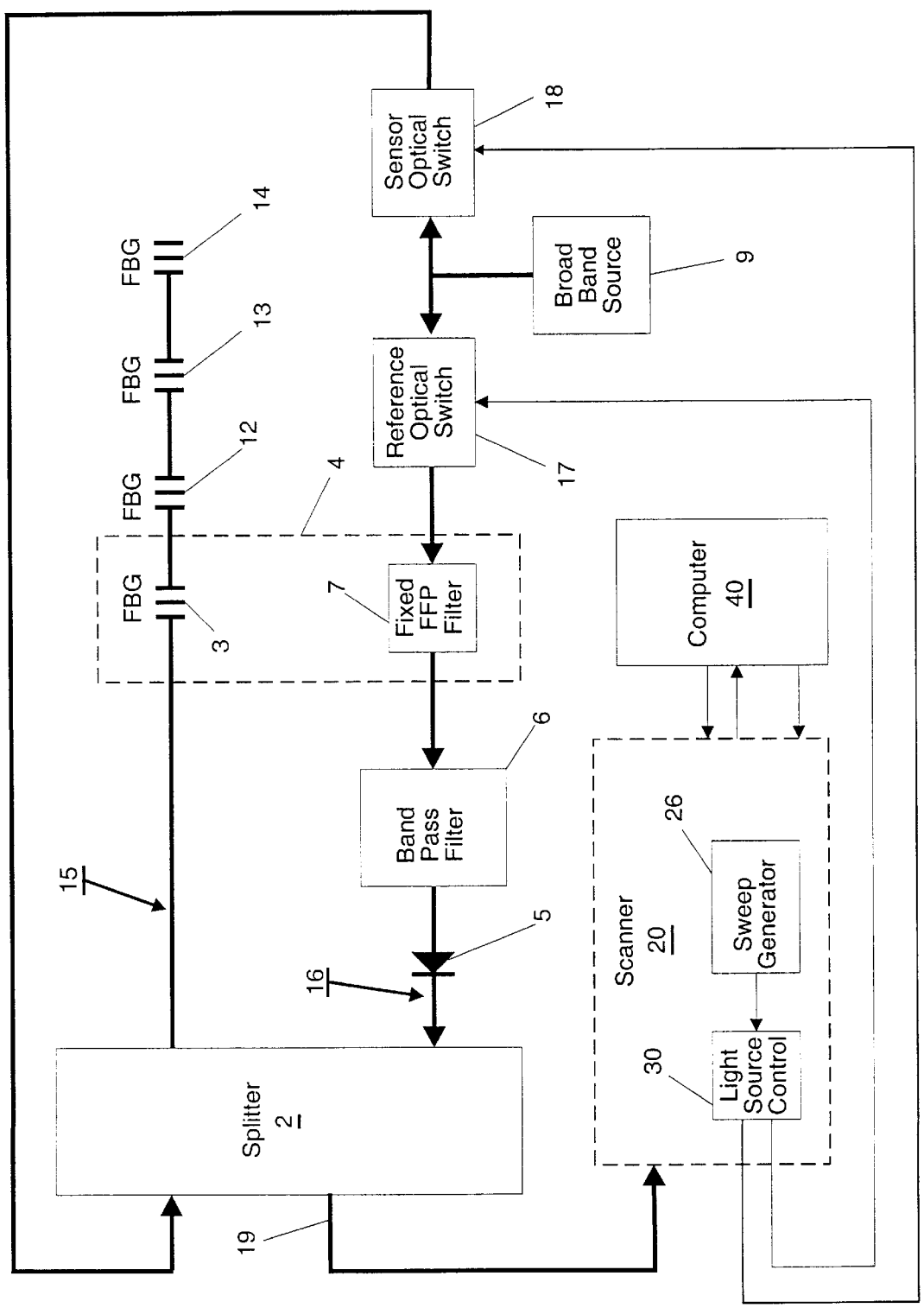
FIG. 10 shows an interrogation system with a reference branch of this invention using a single light source.

FIG. 10 is a diagram of an embodiment, similar to FIG. 2, wherein a single broadband light source 9 provides light for both the measurement branch and the reference branch.

Source 9 is optically coupled to both reference optical switch 17 and measurement optical switch 18. Switch 17 is optically coupled to reference branch 16 and switch 18 is optically coupled through splitter 2 to subject branch 15. Light source control 30 is electrically coupled to switches 17 and 18. Operation is essentially the same as in FIG. 2, except that, instead of switching two light sources alternately off and on, the single source 9 remains on and the two optical branches 15 and 16 are illuminated by alternately turning optical switches 17 and 18 on and off under control of light source control 30. The pattern of switching of optical switches 17 and 18 controls the duration and relative pattern of illumination periods of the reference and measurement branches.

Although only one example of a single light source has been described, it will be apparent to those of ordinary skill in the art that a single light source arrangement can be applied to other embodiments, including those of FIG. 2–9, as well. For example, optical switch 18 could be substituted for subject light source 1 in FIG. 4 and coupled to FBG 14 instead of splitter 2.

The reference system (i.e., the fixed FFP) typically produces a comb of wavelengths spaced from about 0.1–10 nm apart. Within a 50 nm (6250 GHz) spectrum there can typically be from about 5- to about 500 wavelength peaks, that have almost identical spacing. In particular embodiments, the fixed FFP is selected to provide a comb of wavelengths spaced about 1 nm apart, giving about 50 peaks with in a 50 nm spectrum. The configurations and methods of this invention provide accurate identification of these peaks (wavelengths) solving the problems of calibration of sensor and interrogator systems, particularly those based on the use of FBGs. The reference FBG described in the inventive configuration is used to tag one of the peaks of the comb for positive identification eliminates the difficulty of distinguishing between the closely spaced peaks produced by the fixed FFP filter. Calibration at two wavelengths (perferably spaced apart near the extremes of the wavelength range) provides accurate calibration of the spacing of the comb generated by the fixed FFP filter.

In the specific configurations described herein, the scanner sweeps across the wavelength spectrum once in 5 milliseconds and the fixed FFP reference is compared to the unknown FBGs (or to a narrow band light source) every two sweeps. This method employing alternate scans of the reference and the measurement branch output is preferred for noise-limited systems. Alternative scanning/illumination patterns can be employed. For example, the measurement branch can be illuminated and data collected for a plurality of scans before the system is switched to collect data from the reference branch. The reference branch may, for example, be assessed once in every two scans (alternately), once in every 10 scans or once in every 100 scans. The choice of relative branch illumination and scanning pattern is a matter of routine optimization bases on the optical device elements employed and the application of the referencing system. In general, however, the referencing method employed in this invention not only stabilizes the system against thermal and mechanical drifts, but also corrects for filter and PZT non-linearities. Using accurate interpolation methods, unknown FBG shifts can be measured to an accuracy of a few $\mu$strain over very long time periods.

Those of ordinary skill in the art will appreciate that the configurations illustrated herein can be adapted to a variety of systems. Configurations using various combinations of optical device elements, such as switches, couplers and LED and ASE sources are readily apparent to those of ordinary skill in the art based on what has been illustrated. Optical and electrical configurations and optical device elements other than those specifically described herein and alternative methods for collecting data and making data comparisons other than those specifically described herein can be used in the systems and methods of this invention. Also, those of ordinary skill in the art will appreciate that there are functional equivalents of the components (including optical device elements) in the illustrated configurations that can be readily substituted therein or for which ready adaptation is possible. All such variations and functional equivalents are encompassed in this invention. Some are illustrated in the following examples.

A 2×2 optical splitter is shown coupling light from the two branches through the trunk to the scanner; however, other coupling devices and media known in the art can be used. Optical device elements that divert all or only a portion of the light from one optical path (or branch) to another can be employed with routine adaptation in the configuration of this invention to provide optical coupling as described.

Optical switches include mechanical shutters, polymer switches and liquid crystal devices, such as FLC shutters, for blocking a light path. Other optical switching devices useful in this invention, include those that divert light from one path to another instead of just blocking a path. A particularly interesting alternative to splitters and switches is an optical circulator which can have a plurality of ports. Light entering one port of a circulator exits by a second port, and light entering that second port exits by a third port, etc. Circulators are of particular interest for minimization of signal loss.

Various kinds and types of light sources can be used. Broadband sources can range from incandescent to conventional and edge emitting light emitting diodes (LEDs and ELEDs). Narrow band sources include lasers and broadband sources in combination with multistage filters.

The specific configurations have been exemplified using lenseless FFP-TF's, such as those described in the patents cited in the Background of the Invention. Alternative tunable devices can be employed for wavelength scanning, including without limitation: microoptic tunable filters (with lenses, such as those that are commercially available from Queensgate or JDS), acousto-optic tunable filters, tunable diffraction gratings (tunable by moving the detector or by moving the grating), and Michaelson interferometers.

FBGs and FFP filters are temperature sensitive in that their wavelengths change with temperature. It is necessary to maintain the wavelength relationship between the reference FBG and the fixed FFP filter to ensure that the correct tooth of the FFP filter comb is identified. This can be done by various methods. Both devices can be housed in a temperature controlled environment (the same or matched environments) or attached to a thermally conductive mass which ensures temperature tracking, i.e., that both are kept at substantially the same temperature. Thermoelectric devices can be used to regulate the temperatures. Various methods of temperature compensation or stabilization, such as described in the patents listed in the Background of the Invention, can also be employed. The accuracy of the FFP filter reference can be determined by temperature compensation, temperature control or by a measured calibration curve which relates wavelength and temperature. The degree of temperature control of the FBG and fixed FFP reference elements required depends on wavelength variation of the devices with temperature, generally on the application of the reference system and the desired accuracy of the calibration. If, for example, the device exhibits a variation of 10 picometers (in wavelength)/°C., then temperature must be controlled to 0.1° C. to allow measurements to 1 picometer.

Measurement accuracy can be increased by repeatedly scanning the spectrum and averaging, or otherwise statistically analyzing, the measured values. It is therefore desirable to have a scanner capable of scanning at a high repetition rate for the preceding reason as well as for measuring rapidly changing wavelengths and to minimize the effects of thermal and other drifts within the scanner. A significant advantage resulting from capturing and storing only the wavelength values at which peaks or valleys occur is that relatively little data is required to store the results of many scans.

The specific configurations described herein have emphasized the measurement of unknown wavelengths, such as those reflected back from sensor FBGs whose Bragg wavelengths are affected by environmental changes, such as strain or temperature. The interrogations systems, employing the reference system of this invention can also be employed for identifying which of a number of known wavelengths is being generated or transmitted into a measurement branch.

In summary, the invention provides a reference system for a wavelength scanner which superimposes a comb of known wavelength markers on a scan of unknown wavelengths, thereby eliminating the effects of drifts and deviations from linearity in the scanner. Since the teeth of the comb are relatively close together and of known constant spacing, the location of an unknown can be determined by interpolating between its neighboring comb teeth.

We claim:

1. A reference system for measuring wavelengths of radiation from an optical device, comprising:
    an optical path having a reference branch and a measurement branch, said measurement branch for coupling to said optical device;
    a fixed FFP filter in said reference branch;
    a reference FBG in one of said measurement branch or said reference branch; and
    means for selectively illuminating said subject branch and said reference branch.

2. A reference system as in claim 1 wherein said means for illuminating comprises a reference light source coupled to said reference branch and a subject light source coupled to said measurement branch.

3. A reference system as in claim 1 wherein said reference FBG is in said measurement branch.

4. A reference system as in claim 1 wherein said reference FBG is in said reference branch.

5. A reference system as in claim 1 wherein said means for illuminating comprises a reference light source coupled to said reference branch, an optical switch coupled to said measurement branch, and a light source coupled to said optical switch.

6. A reference system as in claim 5 further comprising a light source control coupled to said scanner and to said optical switch and said reference light source.

7. A reference system as in claim 5 wherein s aid light source is a broad band source.

8. A reference system as in claim 5 wherein said light source is a narrow band source.

9. A reference system as in claim 1 wherein said means for selectively illuminating comprises a first optical switch coupled to said measurement branch, a second optical switch coupled to said reference branch, and a light source coupled to said first and second optical switches.

10. A reference system as in claim 1 wherein said means for selectively illuminating comprises an optical diverter coupled to said measurement branch and to said reference branch, and a light source coupled to said optical diverter.

11. A reference system of claim 1 further comprising an optical detector for detecting the wavelength of light exiting said reference branch or said measurement branch.

12. A reference system of claim 11 wherein said means for selectively illuminating comprises a first optical switch coupled to said measurement branch, a second optical switch coupled to said reference branch, a light source coupled to said first and second optical switches and a light source control coupled to said first and second optical switches and said wavelength detecting means.

13. A reference system as in claim 11 wherein said means for selectively illuminating comprises an optical diverter coupled to said measurement branch and to said reference branch, a light source coupled to said optical diverter and a light source control coupled to said optical diverter and to said wavelength detecting means.

14. A reference system of claim 1 wherein said measurement and reference branches are alternately illuminated.

15. An optical wavelength scanner for measuring wavelengths of radiation from an optical device, comprising:
   a reference system having a reference branch and a measurement branch, said measurement branch for coupling to said optical device;
   a fixed FFP filter in said reference branch;
   an FBG in said measurement branch or said reference branch;
   means for alternately illuminating said measurement branch and said reference branch;
   a tunable filter that can be selectively optically coupled to said measurement branch or said reference branch;
   an optical detector optically coupled to said tunable filter;
   a differentiator electrically coupled to said optical detector;
   a zero crossing detector electrically coupled to said differentiator;
   a data latch electrically coupled to said zero crossing detector;
   an actuator mechanically coupled to said tunable FFP;
   a sweep generator electrically coupled to said actuator;
   a counter electrically coupled to said data latch and to said sweep generator; and
   a light source control electrically coupled to said sweep generator and to said means for selectively illuminating said measurement branch or said reference branch.

16. An optical wavelength scanner of claim 15 wherein said means for selectively illuminating comprises a reference light source coupled to said reference branch and a subject light source coupled to said measurement branch.

17. An optical wavelength scanner of claim 15 wherein said reference FBG is in said measurement branch.

18. An optical wavelength scanner of claim 15 wherein said reference FBG is in said reference branch.

19. An optical wavelength scanner of claim 15 wherein said means for selectively illuminating comprises a reference light source coupled to said reference branch, an optical switch coupled to said measurement branch, and a subject light source coupled to said optical switch.

20. An optical wavelength scanner of claim 19 wherein said light source control is coupled to said optical switch and said reference light source.

21. An optical wavelength scanner of claim 19 wherein said subject light source is a broad band source.

22. An optical wavelength scanner of as in claim 19 wherein said subject light source is a narrow band source.

23. An optical wavelength scanner of claim 15 wherein said means for selectively illuminating comprises a first optical switch coupled to said measurement branch, a second optical switch coupled to said reference branch, and a light source coupled to said first and second optical switches.

24. An optical wavelength scanner of claim 15 wherein said means for selectively illuminating comprises an optical diverter coupled to said measurement branch and to said reference branch, and a light source coupled to said optical diverter.

25. An optical wavelength scanner of claim 15 wherein said measurement and reference branches are alternately illuminated.

26. A method for calibrating a reference system for an optical spectrum analyzer, comprising the steps of:
   providing an optical path comprising a reference branch and a measurement branch;
   providing a fixed FFP filter in said reference branch;
   providing a reference FBG in said measurement branch or said reference branch;
   providing a reference light source coupled to said reference branch, an optical switch coupled to said measurement branch, and a calibrated narrow band source coupled to said optical switch;
   illuminating said measurement branch and scanning the optical output of said measurement branch;
   illuminating said reference branch and scanning the optical output of said reference branch;
   locating a wavelength passed by said fixed FFP filter relative to a calibrated wavelength produced by said calibrated narrow band source; and
   locating a wavelength reflected or transmitted by said reference FBG relative to a wavelength produced by said calibrated narrow band source; thereby calibrating the wavelengths passed by said fixed FFP filter.

27. A spectrum analyzer for measurement of the spectral output of a wavelength source which comprises:
   (1) a wavelength reference having an optical path comprising:
      (a) a measurement branch and a reference branch;
      (b) a fixed FFP in said reference branch; and
      (c) a reference FBG in said measurement branch;
   (2) means for selectively illuminating said measurement branch and said reference branch
   (3) means for independently scanning the spectral output of the reference branch and the measurement branch which comprises:
      (a) a tunable filter that can be selectively optically coupled to said measurement branch or said reference branch;
      (b) an optical detector optically coupled to said tunable filter;
      (c) an actuator mechanically coupled to said tunable filter;
      (d) a sweep generator electrically coupled to said actuator; and
      (e) a light source control electrically coupled to said sweep generator and to said means for selectively illuminating said reference branch and said measurement branch.

28. The spectrum analyzer of claim 27 wherein said reference FBG is in said measurement branch.

29. The spectrum analyzer of claim 27 wherein said reference FBG is in said reference branch.

* * * * *

UNITED STATES PATENT AND TRADEMARK OFFICE
CERTIFICATE OF CORRECTION

PATENT NO. : 5,838,437

DATED : Nov. 17, 1998

INVENTOR(S) : Miller et al.

It is certified that error appears in the above-identified patent and that said Letters Patent is hereby corrected as shown below:

At Figure 1, 11 and 12, please insert the label --PRIOR ART--.

At Figure 8, "Signal Light Source" should read --Subject Light Source--.

At column 1, line 39, please replace "he first" with --the first--.

At column 1, line 59, please delete "been used".

At column 2, line 5, please replace "5,361,30" with --5,361,130--.

At column 4, line 14, please replace "1570 mn" with --1570 nm--.

At column 6, line 2, please replace "subject" with --measurement--.

At column 7, line 1, please replace "therefor" with --system--.

At column 10, line 38, please replace "(perferably" with --(preferably--.

At column 10, line 55, please replace "bases" with --based--.

UNITED STATES PATENT AND TRADEMARK OFFICE
CERTIFICATE OF CORRECTION

PATENT NO. : 5,838,437
DATED : November 17, 1998
INVENTOR(S) : Miller, et. al.

It is certified that error appears in the above-identified patent and that said Letters Patent is hereby corrected as shown below:

At column 12, claim 7, line 1 of the claim, please replace "s aid" with -- said --.

Signed and Sealed this

Twenty-first Day of September, 1999

Attest:

Q. TODD DICKINSON

*Attesting Officer*   *Acting Commissioner of Patents and Trademarks*